US010979998B2

United States Patent
Vikberg et al.

(10) Patent No.: US 10,979,998 B2
(45) Date of Patent: Apr. 13, 2021

(54) RADIO NETWORK NODE, COMMUNICATION DEVICE AND METHODS PERFORMED THEREIN

(71) Applicant: Telefonaktiebolaget LM Ericsson (publ), Stockholm (SE)

(72) Inventors: Jari Vikberg, Järna (SE); Angelo Centonza, Stockholm (SE); Gunnar Mildh, Sollentuna (SE); Alexander Pantus, Solna (SE); Paul Schliwa-Bertling, Ljungsbro (SE); Oscar Zee, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/068,740

(22) PCT Filed: Feb. 12, 2016

(86) PCT No.: PCT/SE2016/050103
§ 371 (c)(1),
(2) Date: Jul. 9, 2018

(87) PCT Pub. No.: WO2017/135856
PCT Pub. Date: Aug. 10, 2017

(65) Prior Publication Data
US 2019/0029000 A1  Jan. 24, 2019

Related U.S. Application Data

(60) Provisional application No. 62/291,551, filed on Feb. 5, 2016.

(51) Int. Cl.
*H04W 68/02* (2009.01)
*H04W 76/10* (2018.01)
(Continued)

(52) U.S. Cl.
CPC .......... *H04W 68/02* (2013.01); *H04W 68/00* (2013.01); *H04W 76/10* (2018.02);
(Continued)

(58) Field of Classification Search
CPC ..... H04W 68/02; H04W 76/10; H04W 48/18; H04W 68/00
(Continued)

(56) References Cited

U.S. PATENT DOCUMENTS 9,125,167 B1 * 9/2015 Estrella Chavez . H04W 68/005
10,178,646 B2 * 1/2019 Bosch ................... H04L 63/123
(Continued)

OTHER PUBLICATIONS

3rd Generation Partnership Project, "3rd Generation Partnership Project; Technical Specification Group Services and System Aspects; General Packet Radio Service (GPRS) enhancements for Evolved Universal Terrestrial Radio Access Network (E-UTRAN) access (Release 13)", Technical Specification, 3GPP TS 23.401 V13.4.0, Sep. 1, 2015, pp. 1-334, 3GPP, France.
(Continued)

*Primary Examiner* — Charles N Appiah
*Assistant Examiner* — Nicole M Louis-Fils
(74) *Attorney, Agent, or Firm* — Patent Portfolio Builders, PLLC

(57) ABSTRACT

Embodiments herein relate to a method performed by a radio network node of a communication network. The communication network comprises a first set of functionalities belonging to a first network slice of a first core network node, and a second set of functionalities belonging to a second network slice of a second core network node or the first core network node. The radio network node obtains paging identities comprising first and second paging identities of a wireless device; receives a paging indication for the wireless device from the second network slice; initiates (Continued)

a matching process for matching the second paging identity in the paging indication to the paging identities for locating context of the wireless device; and pages, upon a match of the matching process, the wireless device, for communication with the second network slice, using the context.

23 Claims, 19 Drawing Sheets

(51) Int. Cl.
    *H04W 68/00* (2009.01)
    *H04W 36/00* (2009.01)
    *H04W 36/14* (2009.01)
    *H04W 60/04* (2009.01)

(52) U.S. Cl.
    CPC .... *H04W 36/0005* (2013.01); *H04W 36/0033* (2013.01); *H04W 36/14* (2013.01); *H04W 60/04* (2013.01)

(58) Field of Classification Search
    USPC .......................................................... 455/458
    See application file for complete search history.

(56) References Cited

U.S. PATENT DOCUMENTS

| | | | | |
|---|---|---|---|---|
| 2002/0064141 A1* | 5/2002 | Sakakura | ............... | H04W 48/18 370/331 |
| 2005/0148348 A1* | 7/2005 | Cramby | ............... | H04W 68/12 455/458 |
| 2012/0028657 A1* | 2/2012 | Chin | ............... | H04W 68/00 455/458 |
| 2012/0147824 A1* | 6/2012 | Van der Merwe | .... | H04W 84/02 370/329 |
| 2012/0246325 A1* | 9/2012 | Pancorbo Marcos | ........................ | H04L 63/102 709/227 |
| 2013/0303203 A1* | 11/2013 | Wang | ............... | H04W 68/00 455/458 |
| 2018/0249441 A1* | 8/2018 | Ryoo | ............... | H04L 5/00 |
| 2019/0028249 A1* | 1/2019 | Rost | ............... | H04L 5/0001 |

OTHER PUBLICATIONS

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Technical Specification, 3GPP TS 36.300 V13.1.0, Sep. 1, 2015, pp. 1-254, 3GPP, France.

Deutsche Telecom AG et al., "Requirements for Next Generation Access Technologies", Discussion and Decision, 3GPP TSG RAN ad-hoc, Barcelona, Spain, Jan. 28, 2016, pp. 1-6, RPA160003.

ZTE Corporation, et al., "update the network slicing use case in Smarter", 3GPP TSG-SA WG1 Meeting #71, Belgrade, Serbia, Aug. 17, 2015, pp. 1-3, S1-152074.

3rd Generation Partnership Project, "3rd Generation Partnership Project, Technical Specification Group Services and System Aspects; Feasibility Study on New Services and Markets Technology Enablers—Network Operation; Stage 1 (Release 14)", 3GPP TR 22.7XX V0.20., Nov. 1, 2015, pp. 1-20, 3GPP, France.

MGMN, "5G White Paper", 3GPP Draft, Apr. 13, 2015, pp. 1-125, Retrieved from internet: http://www.3gpp.org/ftp/Meetings_3GPP_SNYC/SA1/Docs.

* cited by examiner

RADIO NETWORK NODE, COMMUNICATION DEVICE AND METHODS PERFORMED THEREIN

CROSS REFERENCE TO RELATED APPLICATIONS

This application is a U.S. National Stage Filing under 35 U.S.C. § 371 of International Application No. PCT/SE2016/050103, filed on Feb. 12, 2016, which claims the benefit of U.S. Provisional Application No. 62/291551, filed on Feb. 5, 2016, the disclosures of which are fully incorporated herein by reference.

TECHNICAL FIELD

Embodiments herein relate to a radio network node, a communication device and methods performed therein for communication. Furthermore, a computer program and a computer readable storage medium are also provided herein. In particular, embodiments herein relate to enabling communication for a wireless device in a communication network.

BACKGROUND

In a typical communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a "NodeB" or "eNodeB" (eNB). A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. FIG. 1 is an overview of the EPC architecture. This architecture is defined in 3GPP TS 23.401 v.13.4.0 wherein a definition of a Packet Data Network Gateway (P-GW), a Serving Gateway (S-GW), a Policy and Charging Rules Function (PCRF), a Mobility Management Entity (MME) and a wireless or mobile device (UE) is found. The LTE radio access, E-UTRAN, comprises one or more eNBs. FIG. 2 shows the overall E-UTRAN architecture and is further defined in for example 3GPP TS 36.300 v.13.1.0. The E-UTRAN comprises eNBs, providing a user plane comprising the protocol layers Packet Data Convergence Protocol (PDCP)/Radio Link Control (RLC)/Medium Access Control (MAC)/Physical layer (PHY), and a control plane comprising Radio Resource Control (RRC) protocol in addition to the user plane protocols towards the wireless device. The radio network nodes are interconnected with each other by means of the X2 interface. The radio network nodes are also connected by means of the S1 interface to the EPC, more specifically to the MME by means of an S1-MME interface and to the S-GW by means of an S1-U interface.

The S1-MME interface is used for control plane between eNodeB/E-UTRAN and MME. The main protocols used in this interface are S1 Application Protocol (S1-AP) and Stream Control Transmission Protocol (SCTP). S1AP is the application layer protocol between the radio network node and the MME and SCTP for example guarantees delivery of signaling messages between MME and the radio network node. The transport network layer is based on Internet Protocol (IP).

A subset of the S1 interface provided functions are:
S1-interface management functions such as S1 setup, error indication, reset and the radio network node and MME configuration update.
UE Context Management functionality such as Initial Context Setup Function and UE Context Modification Function.
E-UTRAN Radio Access Bearer (E-RAB) Service Management functions e.g. Setup, Modify, Release.
Mobility Functions for wireless devices in EPS Connection Management (ECM)-CONNECTED, e.g. Intra-LTE Handover and inter-3GPP-Radio Access Technology (RAT) Handover.
S1 Paging function.
Non Access Stratum (NAS) Signaling Transport function.
Establishment of the S1-MME interface on S1AP protocol level is shown in FIG. 3 as the S1 setup procedure. The purpose of the S1 Setup procedure is to exchange application level data needed for the radio network node and the MME to correctly interoperate on the S1 interface. The radio network node may initiate the procedure by sending an S1 SETUP REQUEST message to the MME once it has gained IP connectivity and it has been configured with at least one Tracking Area Indicator (TAI). The TAI(s) are used by the radio network node to locate IP-addresses of the different MMEs, possibly in different MME pools. The radio network node includes its global radio network node identity and other information in the S1 SETUP REQUEST message. The MME responds with an S1 SETUP RESPONSE message. This S1 SETUP RESPONSE message includes for example the Globally Unique MME identifier(s) (GUM-MEI) of the MME.

An Initial Context Setup process is shown in FIG. 4. An INITIAL CONTEXT SETUP REQUEST message is sent by the MME to request the setup of a UE context or context of a wireless device. This INITIAL CONTEXT SETUP REQUEST message comprises information related to both the UE context and different E-RABs to be established. For each E-RAB the MME includes E-RAB Quality of Service (QoS) parameters such as QoS Class Identifier (QCI) and Allocation and Retention Priority (ARP). The QCI is a scalar that is used as a reference to radio access node-specific parameters that control bearer level packet forwarding treatment, e.g. scheduling weights, admission thresholds, queue management thresholds, link layer protocol configuration, etc., and that have been pre-configured by the operator owning the radio network node. An INITIAL CONTEXT SETUP RESPONSE message is sent by eNB to the MME confirming the setup. Current assumption is that the RAN-CN split is similar for 5G as for 4G, implying an (evolved) S1 interface.

Radio Resource Control (RRC) States
    RRC, which is terminated in the radio network node on the network side from the wireless device, performs functions like:
    Broadcast
    Paging
    RRC connection management
    Resource Block (RB) control
    Mobility functions
    Wireless device measurement reporting and control
    The RRC states are:
    RRC_IDLE
    RRC_CONNECTED A wireless device is in the RRC_CONNECTED state when an RRC connection has been established between the wireless device and the radio network node. If this is not the case, i.e. no RRC connection is established, the wireless device is in the RRC_IDLE state.

EPS Mobility Management (EMM) and EPS Connection Management (ECM) states The EPS Mobility Management (EMM) states describe the Mobility Management states that result from the mobility management procedures e.g. Attach and Tracking Area Update procedures.
    Two major EMM states are:
    EMM-DEREGISTERED
    EMM-REGISTERED.

The EPS Connection Management (ECM) states describe the signaling connectivity between the wireless device and the EPC, which includes both RRC connection between the wireless device and radio network node and S1 connection, i.e. S1AP association, between radio network node and MME.
    Two major ECM states are:
    ECM-IDLE.
    ECM-CONNECTED.

In general, the ECM and EMM states are independent of each other. Transition from EMM-REGISTERED to EMM-DEREGISTERED can occur regardless of the ECM state, e.g. by explicit detach signaling in ECM-CONNECTED or by implicit detach locally in the MME during ECM-IDLE. However there are some relations, e.g. to transition from EMM-DEREGISTERED to EMM-REGISTERED the wireless device has to be in the ECM-CONNECTED state.

The wireless communication industry is at the verge of a unique business crossroads. The growing gap between capacity and demand is an urgent call for new approaches and alternative network technologies to enable mobile operators to achieve more with less. Today, mobile broadband data is growing at an annual rate of 40-50 percent per year in the U.S. and other regions globally. Mobile service providers address these rapidly expanding traffic volumes through deployment of additional network functions, which will be a significant capital expenditure (CAPEX) challenge. The nature of the mobile broadband data traffic is also evolving with new services including new video applications, connected cars and the Internet of Things (IoT). This rapid capacity growth and increasing traffic diversity in LTE networks stresses the assumptions of existing network architectures and operational paradigms.

Network Functions Virtualization (NFV) provides a new path that can increase the flexibility required by mobile service providers and network operators to adapt and accommodate this dynamic market environment. NFV is a new operational approach applying well-known virtualization technologies to create a physical Commercial Off-the-Shelf (COTS) distributed platform for the delivery of end-to-end services in the context of the demanding environment of telecom network infrastructure and applications.

Because EPC is critical to the realization and management of all LTE traffic, it is important to consider use cases related to virtualization of the EPC elements. Each individual EPC element also has specific considerations that determine whether to deploy with NFV. Virtualized EPC (vEPC) is a good example: Multiple virtualized network functions (VNF) can be deployed and managed on a Network Functions Virtualization Infrastructure (NFVI) but must cater to performance scalability in both signaling/control plane and user plane, each potentially demanding different levels of NFVI resources.

vEPC elements can benefit from more agile deployment and scalability. However, virtual resource monitoring and orchestration, along with service awareness, are essential for implementing elasticity effectively. Due to the nature of telecom networks, service Level Agreements (SLA) will be a key issue for a virtualized mobile core network. Because virtualization usually leads to a performance trade-off, equipment vendors must optimize data-plane processing to satisfy carrier-grade bandwidth and latency requirements and sufficient control-plane performance for SLAs needed to ensure availability of regulatory services, such as emergency calls.

VNF is a virtualized network function which serves as a VNF Software for providing virtual network capabilities. A VNF could be decomposed and instantiated in roles such as Virtualized MME (vMME), Virtualized PCRF (vPCRF), Virtualized SGW (vSGW) or Virtualized PDN-GW (vPDN-GW).

NFV is seen as an enabler for network slicing that is described herein.

When looking at the wide range of applications and use cases that are addressed with a 5G network, it is quite obvious these cannot effectively be addressed with a traditional approach of having a purpose built network for each application. This will lead to high cost for networks and devices as well as inefficient use of valuable frequency resources. An operator may have one physical network infrastructure and one pool of frequency bands, which may support many separate virtualized networks, also called network slices. Each network slice may have unique characteristics for meeting the specific requirements of the use case/s it serves.

A key function of 5G Core network is to allow for flexibility in network service creation, making use of different network functions suitable for the offered service in a specific network slice, e.g. Evolved Mobile Broadband (MBB), Massive Machine Type Communication (MTC), Critical MTC, Enterprise, etc.

In addition to Service optimized networks there are more drivers for Network slicing, such as;

Business expansion by low initial investment: Given the physical infrastructure it is much easier to instantiate another Packet Core instance for the business expansion than to set up a new parallel infrastructure or even integrated nodes Low risk by no/limited impact on legacy: As the new instance is logically separated from the other network slices, the network slices can also provide resource isolation between each other. Thus introduction of a new isolated network slice will not impact the existing operator services and therefore only provide low risk Short Time To Market (TTM): The operators are concerned about the time it takes to set up the network for a new service. Slicing of the network for different services/operator use cases provides a separation of concern that can result in a faster setup of a network slice for a certain service as it is separately managed and with limited impact on other network slices Optimized use of resources: Today the network is supporting many different services but with new use cases and more diverging requirements there is a need for optimizing the network for the specific type use case. Network slicing allows to match services to optimized network instances, and it also allows for a more optimized use of those specific resources Allows for individual network statistics: With service specific network slices and possibly even on the level of individual enterprises, there is a possibility of collecting network statistics specific for a limited and well defined group of users of the network slice. This is not the key driver for slicing but rather a benefit that may be a useful tool Slicing can also be used to isolate different services in an operator's network. Future networks are expected to support new use cases going beyond the basic support for voice services and mobile broadband currently supported by existing cellular network, e.g. 2G/3G/4G. Some example use cases include:

Evolution of MBB
  Evolved communication services
  Cloud services
  Extended mobility and coverage
Mission critical Machine Type Communication
  Intelligent traffic systems
  Smart grid
  Industrial applications
Massive Machine Type Communication
  Sensors/actuators
  Capillary networks
Media
  Efficient on-demand media delivery
  Media awareness
  Efficient support for broadcast services These use cases are expected to have different performance requirements, e.g. bit-rates, latencies, as well as other network requirements, e.g. mobility, availability, security etc., affecting the network architecture and protocols.

Supporting these use cases could also mean that new players and business relations are needed compared to existing cellular networks. For instance it is expected that future networks should address the needs of Enterprise services
Government services, e.g. national and/or public safety
Verticals industries, e.g. automation, transportation
Residential users These different users and services are also expected to put new requirements on the network. FIG. 5 shows an example of a network slicing for a case when there exists different network slices in the core network for MBB, Massive MTC and Critical MTC. In other words, the network slices may comprise separate core network instances supporting the different network slices.

Network slicing introduces the possibility that the network slices are used for different services and use cases and there is a need to enable usage of this mechanism for wireless devices using more than one network slice in the communication network to improve the performance of the communication network.

SUMMARY

An object of embodiments herein is to provide a mechanism for improving performance of the communication network in an efficient manner.

According to an aspect the object is achieved by a method performed by a radio network node for enabling communication for a wireless device in a communication network, wherein the communication network comprises partitioned sets of functionalities wherein a first set of functionalities belongs to a first network slice, supporting the wireless device, of a first core network node, and a second set of functionalities belongs to a second network slice, supporting the wireless device, of a second core network node or the first core network node. The first and second sets of functionalities are separated from one another and other sets of functionalities out of a total set of functionalities in the communication network. The radio network node obtains paging identities comprising a first paging identity and a second paging identity of the wireless device. The first paging identity is associated with the first network slice and the second paging identity is associated with the second network slice. The radio network node receives a paging indication for the wireless device from the second network slice, when the wireless device is connected to the first network slice, which paging indication comprises the second paging identity of the wireless device. The radio network node initiates a matching process for matching the second paging identity in the paging indication to the obtained paging identities for locating context of the wireless device, which context is related to the first network slice. The radio network node pages, upon a match of the matching process, the wireless device, connected to the first network slice, for communication with the second network slice by using the located context of the wireless device.

According to another aspect the object is achieved by a method performed by a communication device for enabling communication for a wireless device in a communication network. The communication network comprises partitioned sets of functionalities wherein a first set of functionalities belongs to a first network slice, supporting the wireless device, of a first core network node, and a second set of functionalities belongs to a second network slice, supporting the wireless device, of a second core network node or the first core network node. The first and second sets of functionalities are separated from one another and other sets of functionalities out of a total set of functionalities in the communication network. The communication device provides, to a radio network node associated with the first and second network slice, paging identities comprising a first paging identity and a second paging identity of the wireless device, which first paging identity is associated with the first network slice and the second paging identity is associated with the second network slice.

According to still another aspect the object is achieved by providing a radio network node for enabling communication for a wireless device in a communication network. The communication network comprises partitioned sets of functionalities wherein a first set of functionalities belongs to a first network slice, supporting the wireless device, of a first core network node, and a second set of functionalities belongs to a second network slice, supporting the wireless device, of a second core network node or the first core network node. The first and second sets of functionalities are separated from one another and other sets of functionalities out of a total set of functionalities in the communication network. The radio network node is configured to obtain paging identities comprising a first paging identity and a second paging identity of the wireless device, which first paging identity is associated with the first network slice and the second paging identity is associated with the second network slice. The radio network node is further configured to receive a paging indication for the wireless device from the second network slice, when the wireless device is connected to the first network slice, which paging indication comprises the second paging identity of the wireless device. The radio network node is configured to initiate a matching process for matching the second paging identity in the received paging indication to the obtained paging identities for locating context of the wireless device, which context is related to the first network slice. The radio network node is also configured to page, upon a match of the matching process, the wireless device, connected to the first network slice, for communication with the second network slice by using the located context of the wireless device.

According to yet still another aspect the object is achieved by providing a communication device for enabling communication for a wireless device in a communication network. The communication network comprises partitioned sets of functionalities wherein a first set of functionalities belongs to a first network slice, supporting the wireless device, of a first core network node, and a second set of functionalities belongs to a second network slice, supporting the wireless device, of a second core network node or the first core network node. The first and second sets of functionalities are separated from one another and other sets of functionalities out of a total set of functionalities in the communication network. The communication device is configured to provide, to a radio network node associated with the first and second network slice, paging identities comprising a first paging identity and a second paging identity of the wireless device, which first paging identity is associated with the first network slice and the second paging identity is associated with the second network slice.

It is furthermore provided herein a computer program comprising instructions, which, when executed on at least one processor, cause the at least one processor to carry out any of the methods above, as performed by the radio network node or the communication device. It is additionally provided herein a computer-readable storage medium, having stored thereon a computer program comprising instructions which, when executed on at least one processor, cause the at least one processor to carry out the method according to any of the methods above, as performed by the radio network node or the communication device.

Embodiments herein introduce an efficient manner of enabling sliced network structuring and usage by introducing additional signaling procedures for enabling paging, from a network slice, of a multi-slice wireless device when it is in e.g. RRC_CONNECTED mode to another network slice. Embodiments herein thus enable the communication for the wireless device from multiple network slices leading to an improved performance of the communication network.

BRIEF DESCRIPTION OF THE DRAWINGS

Embodiments will now be described in more detail in relation to the enclosed drawings, in which.

DETAILED DESCRIPTION

As part of developing embodiments herein a problem has first been identified. A management system may comprise a domain manager (DM), also referred to as the operation and support system (OSS) node managing the radio network nodes. A DM may further be managed by a network manager (NM). The radio network nodes may be interfaced by X2 and/or S1 interfaces, whereas an interface between two DMs is referred to as Itf-P2P. The management system may configure the radio network nodes, as well as receive observations associated with features in the radio network nodes. For example, DM observes and configures radio network nodes, while NM observes and configures DM, as well as the radio network nodes via DM. By means of configuration via the DM, NM and related interfaces, functions over the X2 and S1 interfaces can be carried out in a coordinated way throughout the RAN, eventually involving the Core Network, i.e. MME and S-GWs.

Figure 1:
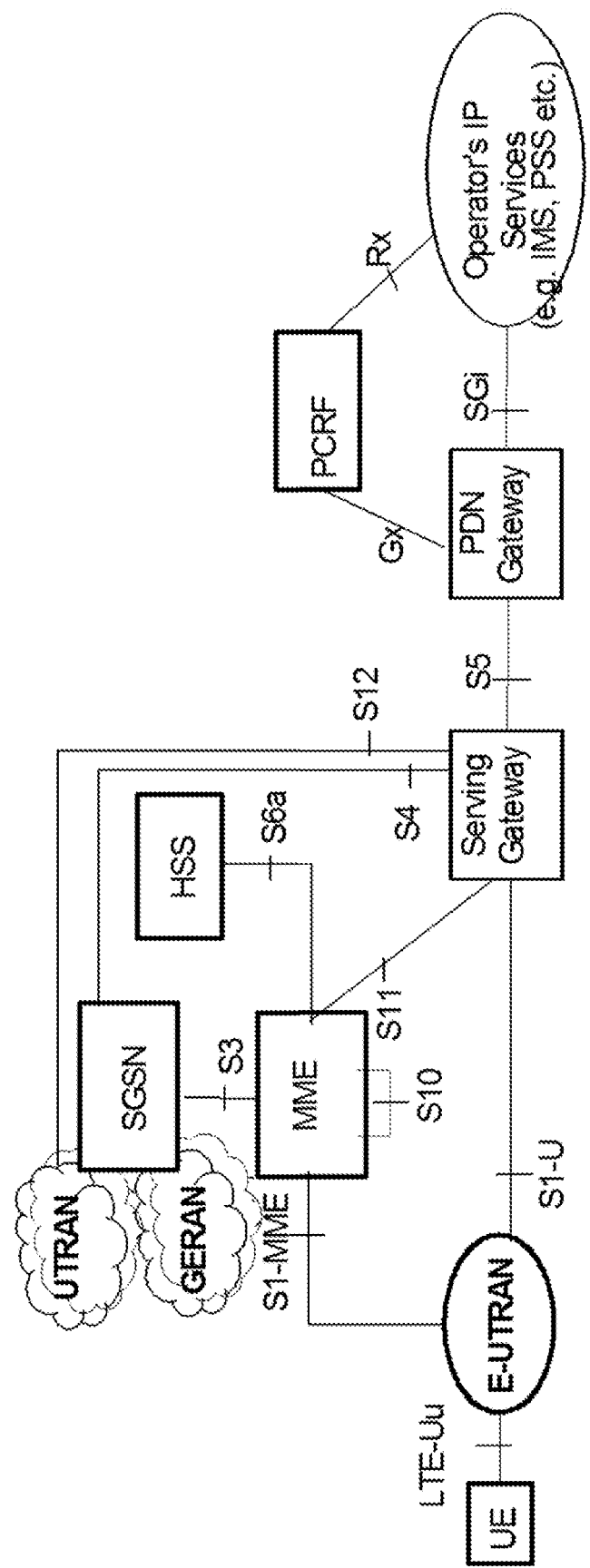
FIG. 1 is a schematic overview depicting a communication network according to prior art.
Figure 2:
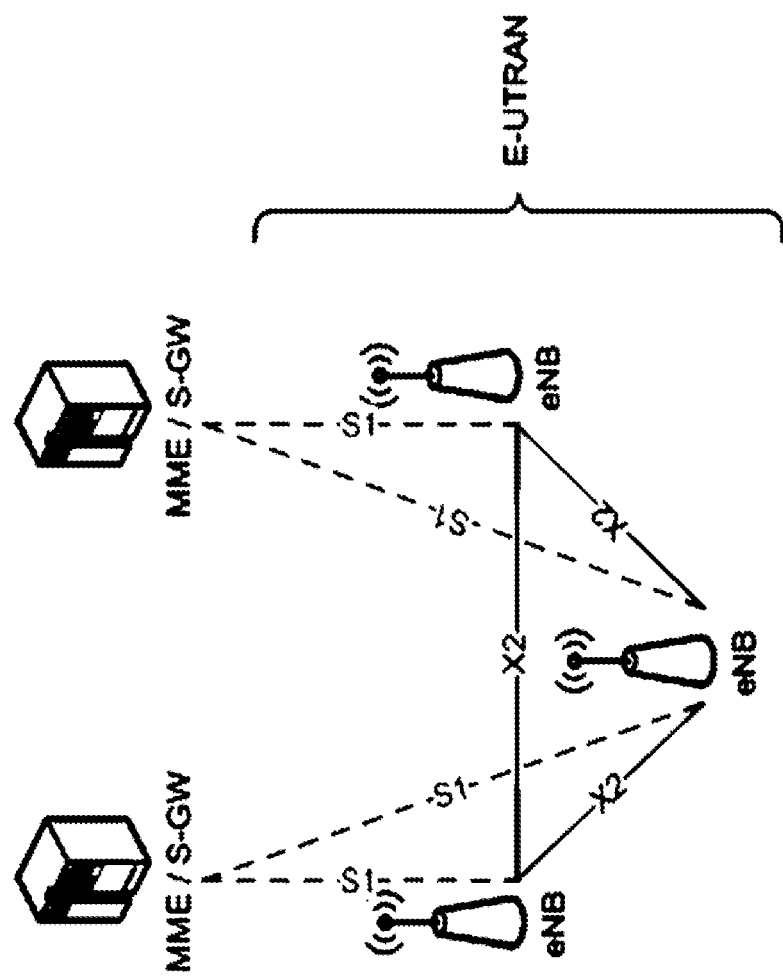
FIG. 2 is a schematic overview depicting a radio access network in connection with a core network.
Figure 3:
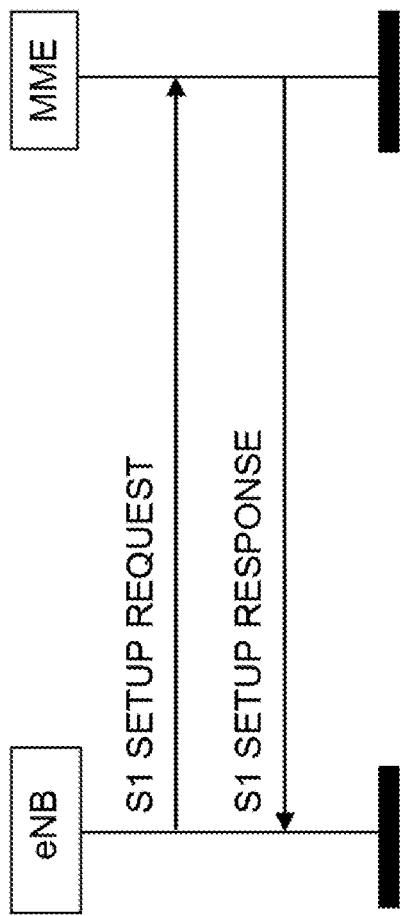
FIG. 3 is a signalling scheme according to prior art.
Figure 4:
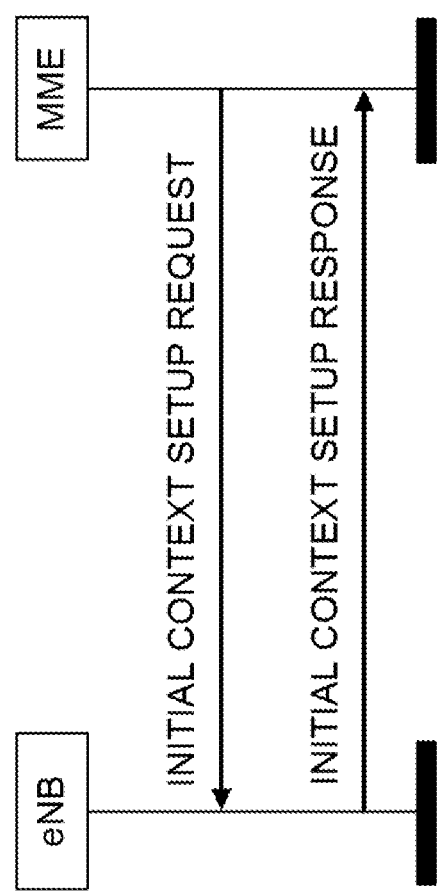
FIG. 4 is a signalling scheme according to prior art.
Figure 5:
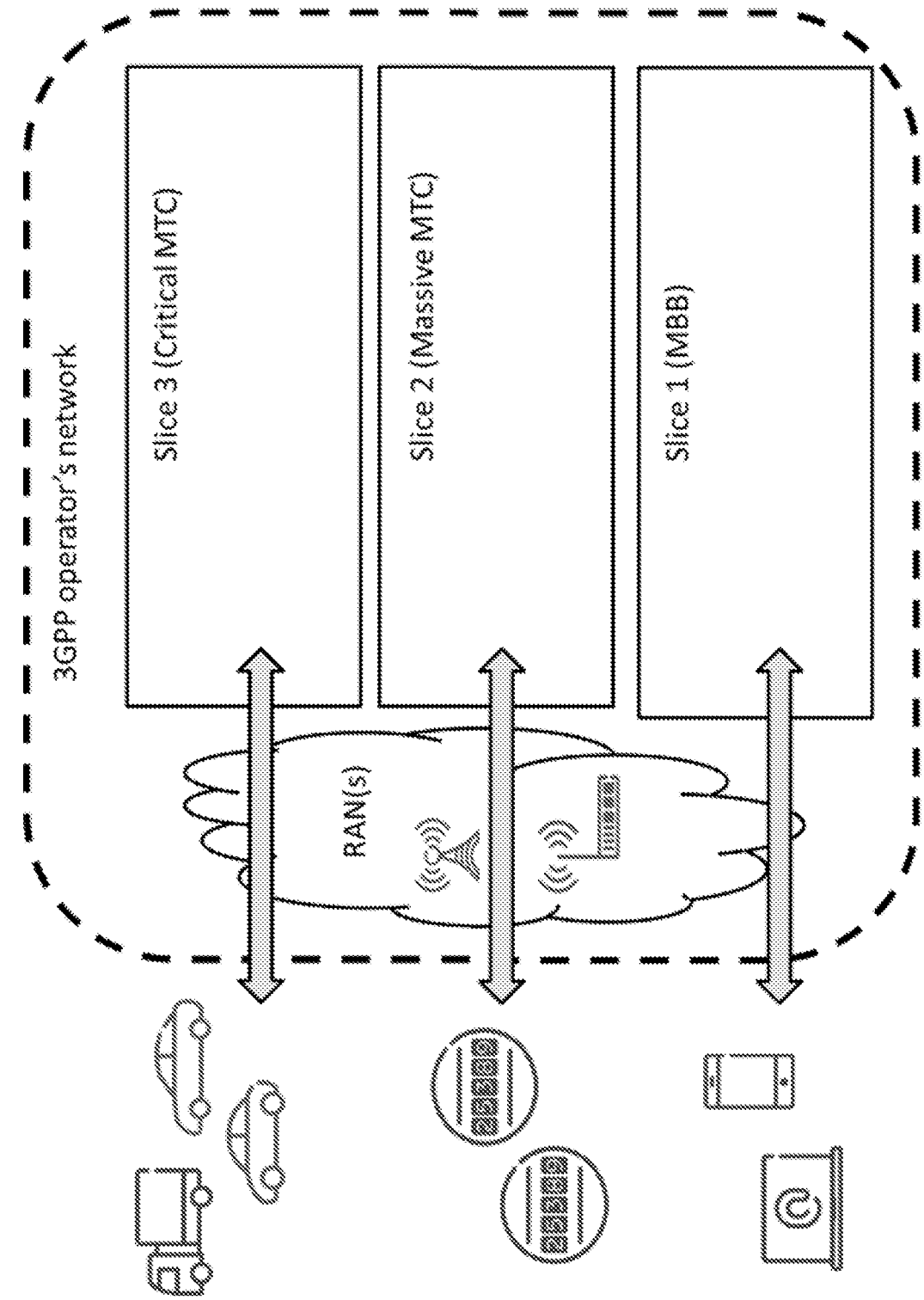
FIG. 5 is a schematic overview depicting an example of a slicing of a core network according to prior art.
Figure 6:
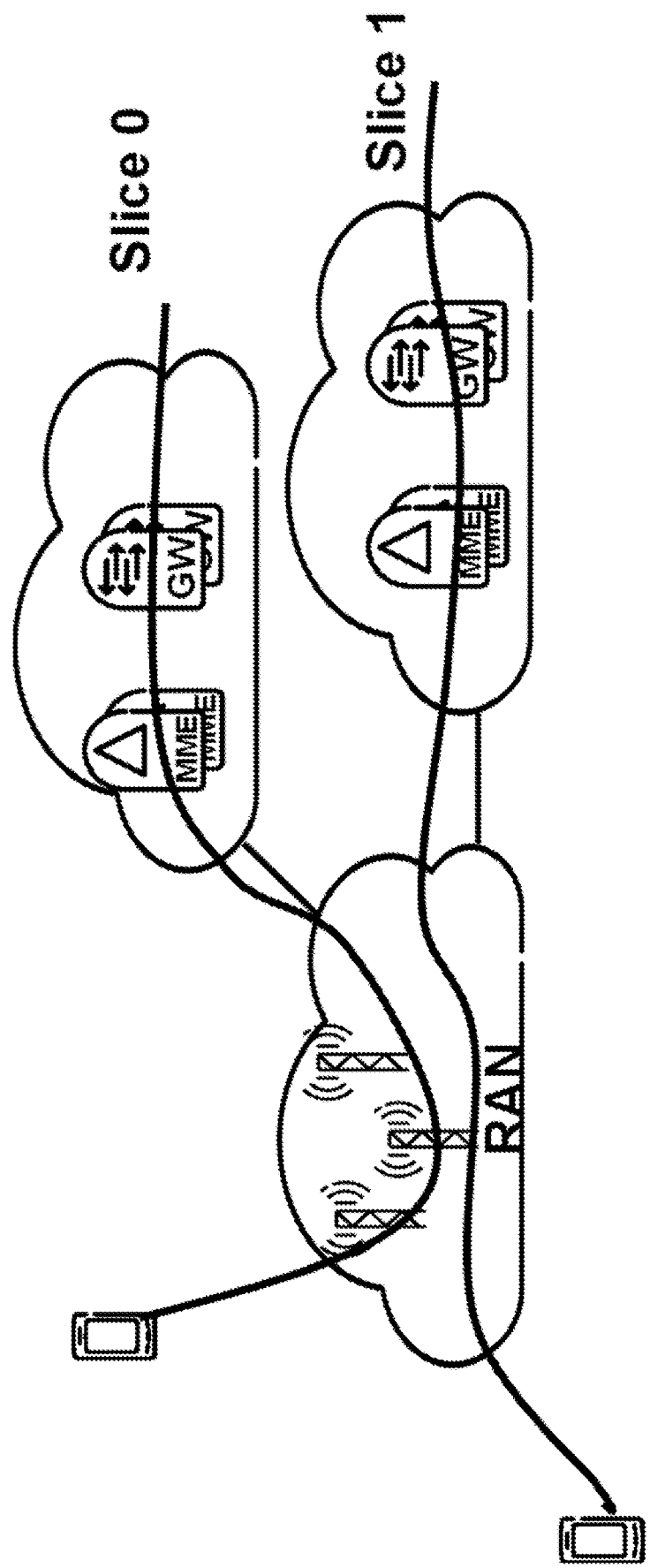
FIG. 6 is a schematic overview depicting an example of a slicing of a core network.

Network slicing is about creating logically separated partitions of the network, addressing different business purposes. These "network slices" are logically separated to a degree that they can be regarded and managed as networks of their own. The network slicing may apply to both LTE based networks and 5G Radio Access Technology (RAT). The network slicing supports business expansion, i.e. improving the cellular operator's ability to serve other industries, e.g., by offering connectivity services with different network characteristics, such as performance, security, robustness, and complexity. One shared Radio Access Network (RAN) infrastructure, comprising one or more RANs, connects to several Evolved Packet Core (EPC) instances, e.g. one EPC instance per network slice. As the EPC functions are being virtualized, it is assumed that the operator shall instantiate a new Core Network (CN) when a new slice should be supported. This architecture is shown in FIG. 6. Slice 0 can for example be a Mobile Broadband slice and Slice 1 can for example be a Machine Type Communication network slice. In addition, it is also possible that parts of the EPC are shared between the different network slices. One such example of shared EPC functionality is MME.

Figure 7:
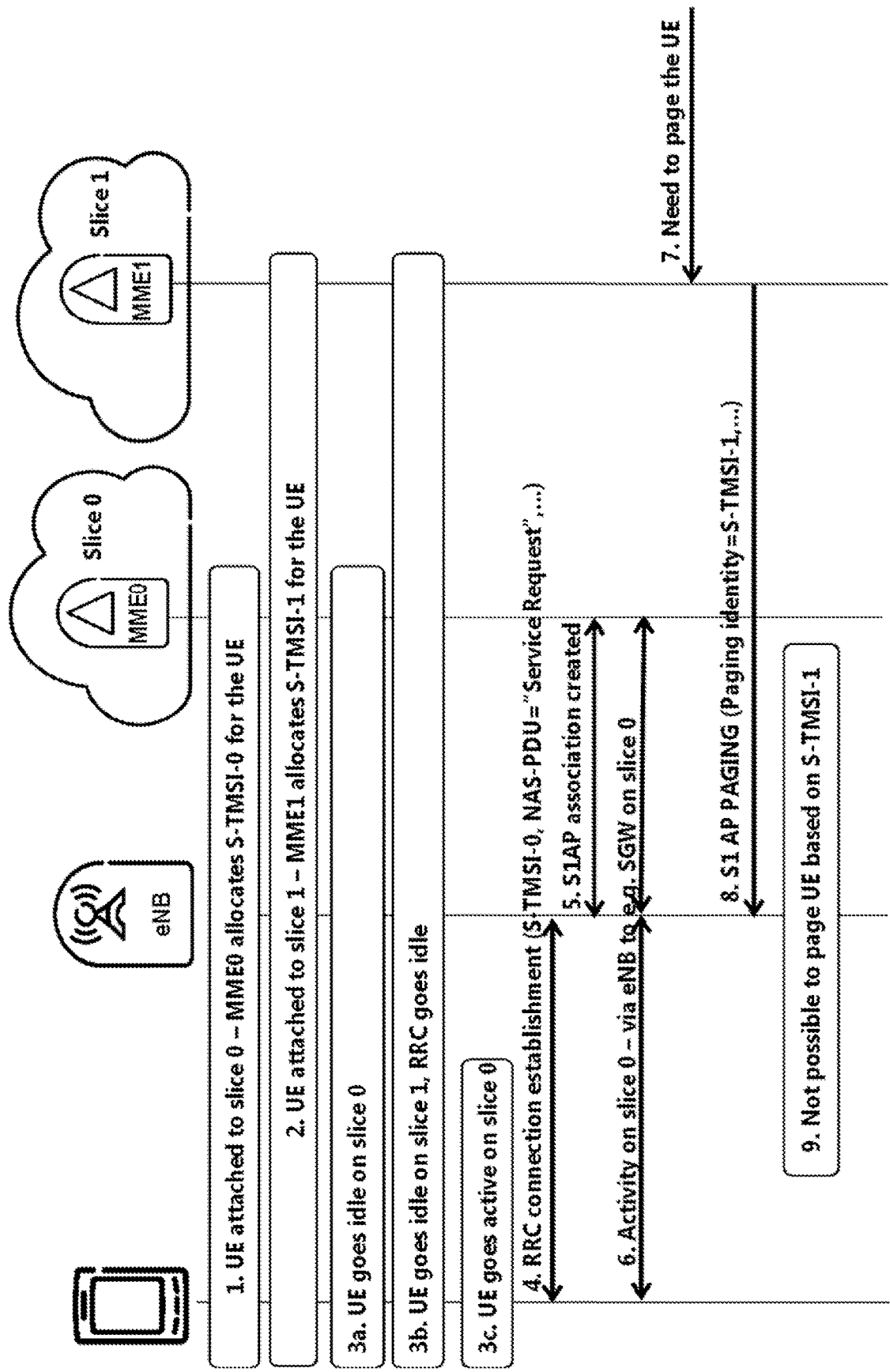
FIG. 7 is a signalling scheme for paging a wireless device attached to two network slices.

For a wireless device that only can attach to one single slice at a time, the ECM state and RRC state are synchronized, but for a wireless device which can be attached to multiple slices, the correlation between these two states are lost in the main working assumption case as shown in FIG. 7. In a shared RAN used for multiple network slices, the following is assumed A RAN which is shared between slices with individual slice MME instances, individual core network nodes or individual core network node pools.

Between the individual slice MME instances, there is no correlation on SAE-Temporary Mobile Subscriber Identity (S-TMSI) generation or other identifiers.

A wireless device can be attached to multiple network slices.

The RRC connection between wireless device and the radio network node is shared between network slices.

And the following interactions occur and describe the problem in reference to FIG. 7 where the wireless device (UE) is to be paged from Slice 1:

1. UE is attached to slice 0, MME-0 has allocated S-TMSI-0 for the UE.
2. UE is attached to slice 1, MME-1 has allocated S-TMSI-1 for the UE.
3a-3c UE enters RRC idle after inactivity on all the slices and then UE triggers activity on slice 0.
4. The RRC connection is established using S-TMSI-0 and NAS Protocol Data Unit (PDU) "Service Request" is sent towards MME0.
5. The S1AP association for the UE is created between eNB and MME0, in slice 0.
6. Any slice 0 related activity may take place for the UE, e.g. via eNB to a Serving GW (S-GW) in slice 0. UE remains in RRC_CONNECTED state.
7. The MME1 in slice 1 receives an indication of the need to page the UE in slice 1.
8. MME1 forwards the S1-AP PAGING to the eNB using S-TMSI-1 as the paging identity, in reality this paging may be sent to multiple eNBs serving the current registration area, such as a list of Tracking Areas.
9. The problem identified herein is that it is not possible for the eNB to page the UE using S-TMSI-1 as the UE in current standardization is not listening to broadcasted page at the required Paging Occasion (PO) during RRC connected state. In addition, it is not possible for the eNB to associate the received paging to the current RRC connection for the UE based on S-TMSI-1. This is because there is no correlation between the UE context associated already activated for Slice 0 and the identify S-TMSI-1 assigned by the Slice 1 MME.

In another scenario addressed by embodiments herein a single MME would be able to support multiple network slices, i.e. this means that the MME would have shared functionality between the network slices supported by the MME. This is not possible according to current standards. A wireless device would only be able to attach once to the MME i.e. it would not be able to perform an attach procedure that is slice-specific as the wireless device would receive a single temporary identity that is not slice-specific. Embodiments herein cover e.g. the case when the multiple network slices where the wireless device is connected to are provided by multiple core network nodes and connectivity to each core network node is provided by separate S1 associations or where the network slices are provided by a same core network node.

Figure 8:
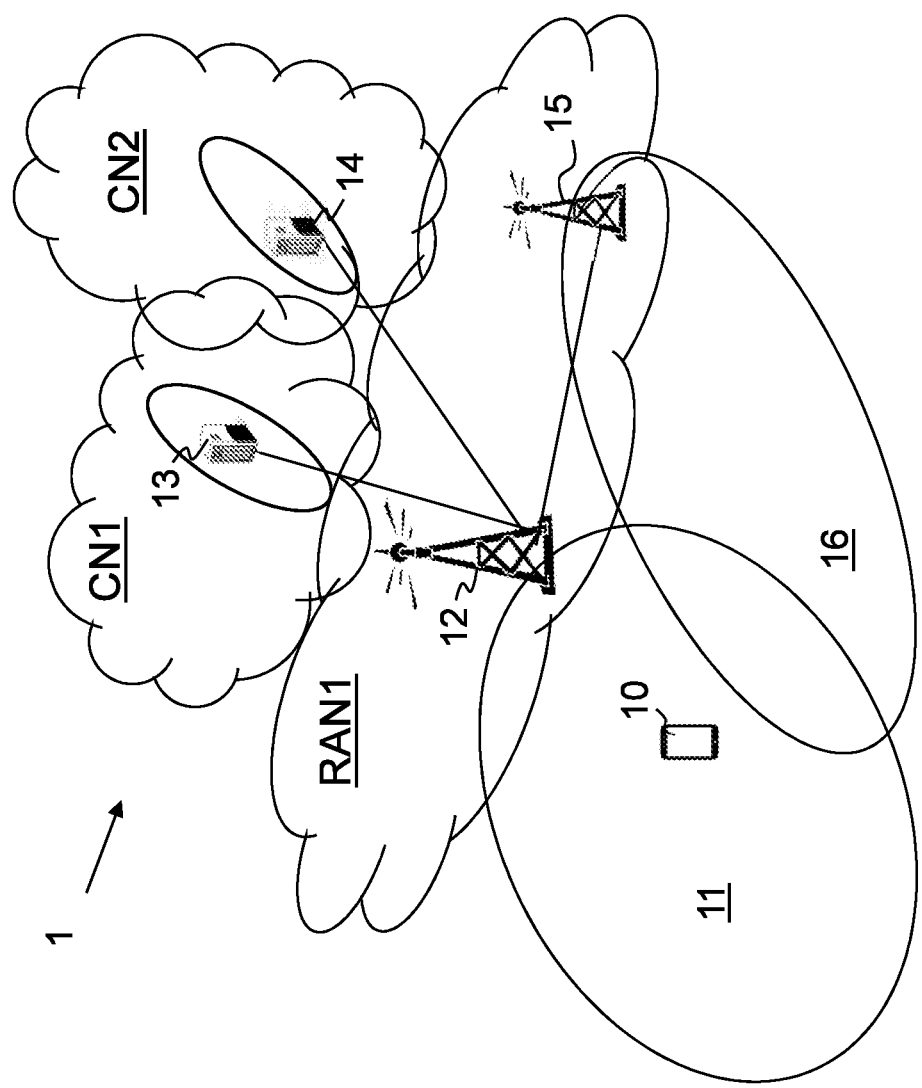
FIG. 8 is a schematic overview depicting a communication network according to embodiments herein.

Embodiments herein relate to communication networks in general. FIG. 8 is a schematic overview depicting a communication network 1. The communication network 1 comprises one or more RANs connected to one or more of CNs, exemplified as a first CN (CN1) and a second CN (CN2), all packet switched core networks. The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the communication network 1, wireless devices e.g. a wireless device 10 such as a mobile station, a non-access point (non-AP) STA, a STA, a user equipment and/or a wireless terminal, are connected via the one or more RANs, to the one or more CNs. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or any device communicating within a cell or service area.

The communication network 1 comprises a radio network node 12, also referred herein as first radio network node 12, providing radio coverage over a geographical area, a first service area 11, of a first radio access technology (RAT), such as LTE, UMTS, Wi-Fi or similar. The first radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the first radio network node 12 depending e.g. on the first radio access technology and terminology used. The first core network is virtually network sliced into one or more network slices, each network slice or core network slice supports one or more type of wireless devices and/or one or more type of services i.e. each network slice supports a different set of functionalities. Network slicing introduces the possibility that the network slices are used for different services and use cases and these services and use cases may introduce differences in the functionality supported in the different network slices. Each network slice may comprise one or more network nodes or elements of network nodes providing the services/functionalities for the respective network slice. Each network slice may comprise a network node such as a RAN node or a core network node e.g. Radio Software Defined Networking (SDN) nodes, MMEs, S-GWs, Serving GPRS Support Nodes (SGSN), or corresponding nodes in e.g. a 5G network or similar. The GPRS meaning General Packet Radio Services. For example, a first network slice for e.g. MBB devices may comprise a first core network node 13 of the CN1. A second network slice for e.g. a certain enterprise may comprise a second core network node 14 of the CN2. Each network slice supports a set of functionalities out of a total set of functionalities in the communication network. E.g. the first network slice node 13 supports a first set of functionalities out of the total set of functionalities in the communication network 1. The first set of functionalities is separated from different sets of functionalities out of the total set of functionalities in the communication network 1. E.g. the first set of functionalities being associated with MBB devices is separated or logically separated, e.g. using separated data storage or processing resources, from a second set of functionalities of the second network slice.

The first set of functionalities may use one or more resources in a core network of the communication network, which one or more resources are separated from other resources used by a different set of functionalities, i.e. different network slices, out of the total set of functionalities in the communication network 1. The resources may then be dedicated or virtually dedicated for each set of functionalities or network slice. Thus, the core network node may be separated from other core network nodes supporting the second set of functionalities out of the total set of functionalities in the communication network. Separated meaning herein physically separated wherein the core network nodes may be executed on different hardware platforms and therefore using different resources of the hardware, and/or logically separated wherein the core network nodes may be executed on a same hardware platform and use different resources such as memory parts or resources of processor capacity but may also use some same resources of the hardware e.g. a single physical core network node may be partitioned into multiple virtual core network nodes.

Hence, the first core network node 13 supports the first set of functionalities out of the total set of functionalities in the first core network of the communication network, which first set of functionalities belongs to the first network slice of the first core network, and is separated from another set of functionalities out of the total set of functionalities in the first network. The second set of functionalities out of a total set of functionalities in the communication network may be different, partly the same or similar as ones supported by the first network slice.

Furthermore, the communication network 1 comprises a second radio network node 15 providing radio coverage over a geographical area, a second service area 16, of a second radio access technology (RAT), such as LTE, UMTS, Wi-Fi or similar. The second radio network node 15 may be a radio access network node such as radio network controller or an access point such as a WLAN access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the second radio network node 15 depending e.g. on the second radio access technology and terminology used. The second radio network node 15 is comprised in the same or a different RAN as the first radio network node 12 and the first and second RATs may be the same or different RATs. The first radio network node 12 is connected to the second radio network node 15, over e.g. an X2 connection/s, S1 connection/s or a combination thereof or similar.

According to embodiments herein the wireless device 10 provides all paging identities to the first radio network node 12 whenever these paging identities have been allocated by the core network node in a specific network slice. One example is when the RRC connection is established and another example is when the MME allocates a new paging identity, e.g. S-TMSI, for the wireless device 10 while in RRC_CONNECTED state. The paging identities may be provided to the first radio network node 12 from the wireless device 10 or the core network node 13 upon attachment of the wireless device to the first network slice. The device providing the paging identities is herein called Communication device, and is exemplified herein as the wireless device 10 or the first core network node 13. The paging identities may e.g. be a list of S-TMSIs, if these are unique between network slices, or a combination of a slice identifier and an S-TMSI, assuming that S-TMSIs are unique within a network slice. The first radio network node 12 may store all received paging identities in a context of the wireless device 10, and transfer this context between RAN entities during e.g. a handover to the second radio network node 15. The context may also be associated with an active dedicated RRC connection, e.g. Cell Radio Network Temporary Identity (C-RNTI), of the wireless device 10.

In case of a paging request, with e.g. a paging identity of the wireless device 10 associated with the second network slice, from the second network slice arrives to the first radio network node 12 for the wireless device 10 being in RRC-_CONNECTED state due to activity on another slice, the first radio network node 12 can intercept the paging request, locate the context with the received paging identity of the wireless device 10 associated with the second network slice, by means of mapping the identity contained in the paging request with the stored paging identities associated to the context already active for the wireless device 10, and forward a paging message on the dedicated RRC connection associated with the context of the wireless device 10. Hence, the wireless device 10 may be paged from the second network slice, when being connected to the first network slice, leading to an improved performance of the communication network 1.

Figure 9:
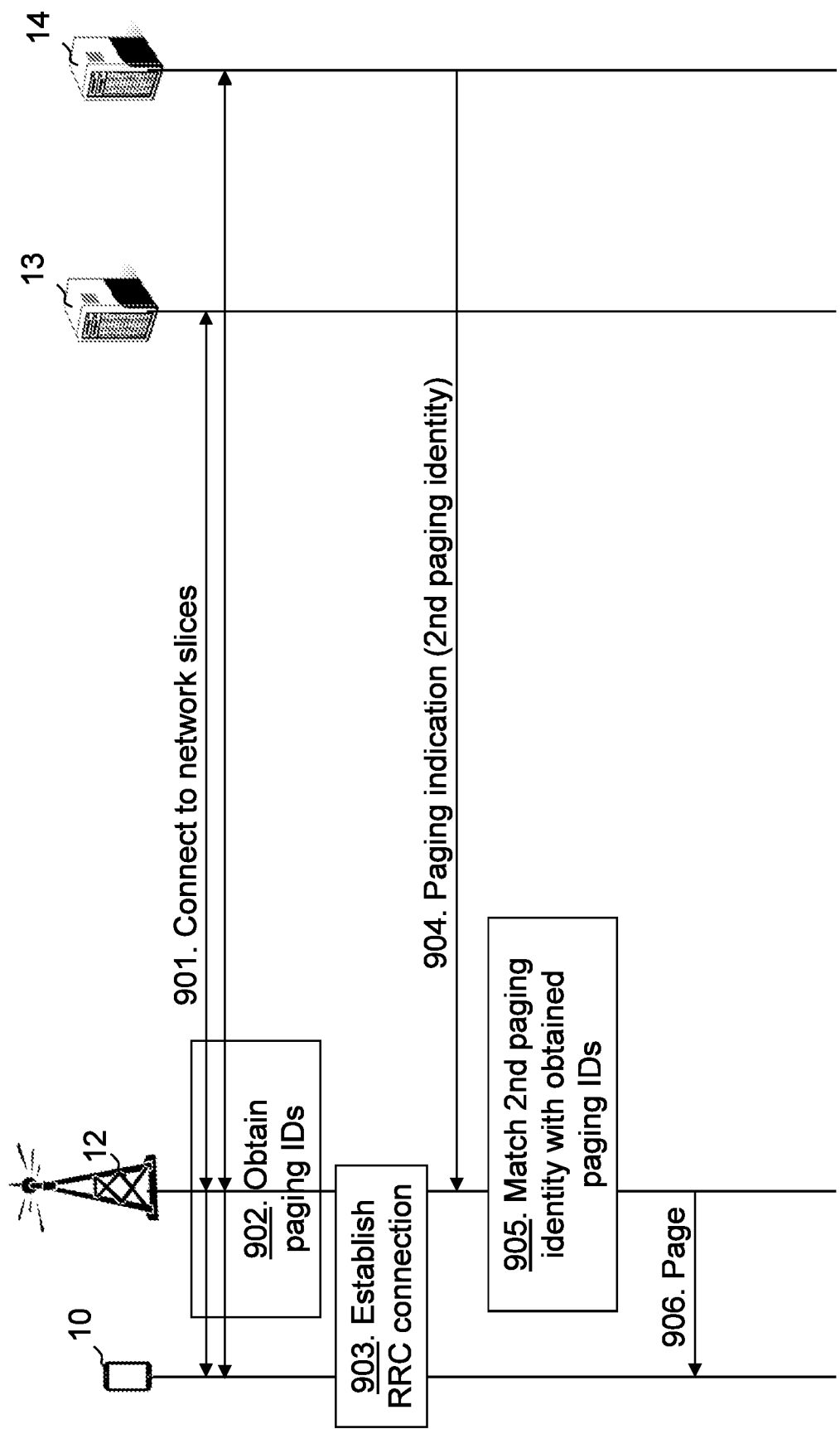
FIG. 9 is a combined flowchart and signalling scheme according to embodiments herein.

FIG. 9 is a combined flowchart and signaling scheme according to embodiments herein for enabling communication for the wireless device 10. The core network side implements a plurality of different core network nodes supporting different network slices. Each core network node may be a single MME or a pool of MMEs, and additional nodes are likely to exist both for the wireless device 10 and other wireless devices. The first radio network node 12 is connected to the different core network nodes using e.g. S1-MME interfaces. It should here be understood that the first and second network slice may be provided by the same core network node but is exemplified herein as being provided by two different core network nodes.

Action 901. The wireless device 10 connects to the first and second core network node for providing the respective set of functionalities to the wireless device 10. The wireless device 10 connects to the core network nodes, i.e. performs attach and connects over control plane connections and/or user plane connections. During these attachment procedures the wireless device 10 is allocated a first paging identity by the first core network node 13 and a second paging identity by the second core network node 14 for temporary identification of the wireless device 10 in the core network node or network slice.

Action 902. The first radio network node 12 obtains the paging identities of the connections. The paging identities comprises the first paging identity and the second paging identity of the wireless device 10. The first paging identity is associated with the first network slice and the second paging identity is associated with the second network slice.

Action 903. The wireless device 10 and the first radio network node 12 may then establish an RRC connection, that is, the wireless device 10 enters into an RRC_CONNECTED state. The first radio network node 12 may obtains the paging identities of the connections during this establishment or during the attaching, action 901, from the wireless device 10 or from the first core network node 13. During the establishment of the RRC connection, context is setup and stored for the active RRC connection for the wireless device Action 904. The first radio network node 12 then receives a paging indication for the wireless device 10 from the second core network node 14, when the wireless device 10 is connected to the first network slice. The paging indication comprises the second paging identity of the wireless device 10. The paging indication may be a paging request.

Action 905. The first radio network node 12 initiates a matching process, e.g. performs a matching, for matching the second paging identity received in the paging indication, to the obtained paging identities for locating context of the wireless device 10. The context is related to the first network slice, e.g. information regarding signalling resource bearers (SRB) or similar for the wireless device 10 communicating with the first network slice. When the second paging identity received in the paging indication matches the second paging identity in the obtained paging identities, the first radio network node finds out that this wireless device 10 with the second paging identity is in RRC_CONNECTED state using the context for communicating with the first radio network node 12.

Action 906. Upon a match of the matching process, the first radio network node 12 then pages the wireless device 10 for communication with the second network slice by using the located context of the wireless device 10. E.g. the first radio network node 12 may perform a unicast paging over the RRC connection established for the first network slice for the wireless device 10.

Hence, according to embodiments herein, the wireless device 10 may provide all paging identities to the first radio network node 12 whenever these paging identities have been allocated by a core network node in a specific network slice. These paging identities are also referred to as "UE-Paging-Identities" herein. One example is when the RRC connection is established and another example is when the MME allocates a new S-TMSI for the wireless device 10 while in RRC_CONNECTED state. The paging identities may be S-TMSIs, if these are unique between network slices, or a combination of a slice identifier and a S-TMSI, assuming that S-TMSIs are unique within a network slice. The first radio network node 12 may store all received paging identities in a context of the wireless device 10, and may transfer these between RAN entities during handover. The context may also be associated with the active RRC connection.

It shall be noted that in order to reduce the exposure of S-TMSI, the wireless device 10 may avoid sending S-TMSI (s) or a combination of a slice identifier and a S-TMSI to the first radio network node 12 when the radio interface is not protected by means of encryption i.e. before an Access Stratum (AS) Security Setup is complete. In order to ensure inter-slice isolation, the first radio network node 12 may avoid propagating the S-TMSI or a combination of a slice identifier and a S-TMSI to the rest of the mobile network, e.g. other core network nodes, that does not serve the network slice this S-TMSI or a combination of a slice identifier and a S-TMSI has been initially intended for.

In case of the request, with paging identity as described above, from the second network slice arrives to the first radio network node 12 for the wireless device 10 being in RRC_CONNECTED state due to activity on the first network slice, the first radio network node 12 may intercept the page, locate the context of the wireless device 10 with the received paging identity and forward the paging on the RRC connection associated with the located context.

Thus, the wireless device 10 is allocated Paging identities in different network slices e.g. when attaching. The wireless device 10 and/or the first and second core network nodes provide all allocated Paging identities, e.g. a list of paging identities "UE-Paging-Identities", to the first radio network node 12. The first radio network node 12 may store the received Paging identities, and use these to enable efficient Paging coordination i.e. sending unicast paging over an RRC connection established for another slice.

An additional enhancement to the concept is that the wireless device 10 provides a secure or security signature, e.g. a keyed Hash Message Authentication Code (HMAC) to the first radio network node 12 of the paging identities, e.g. S-TMSIs, that the wireless device 10 provides to the first radio network node 12.

In another embodiment the first core network node 13, e.g. an MME, serving multiple slices may generate one paging identity per network slice when the wireless device 10 registers to that specific network slice. Such paging identities may also be used as described above i.e. wireless device 10 provides also these paging identities to the first radio network node 12 that uses these paging identities for paging coordination.

Figure 10A:
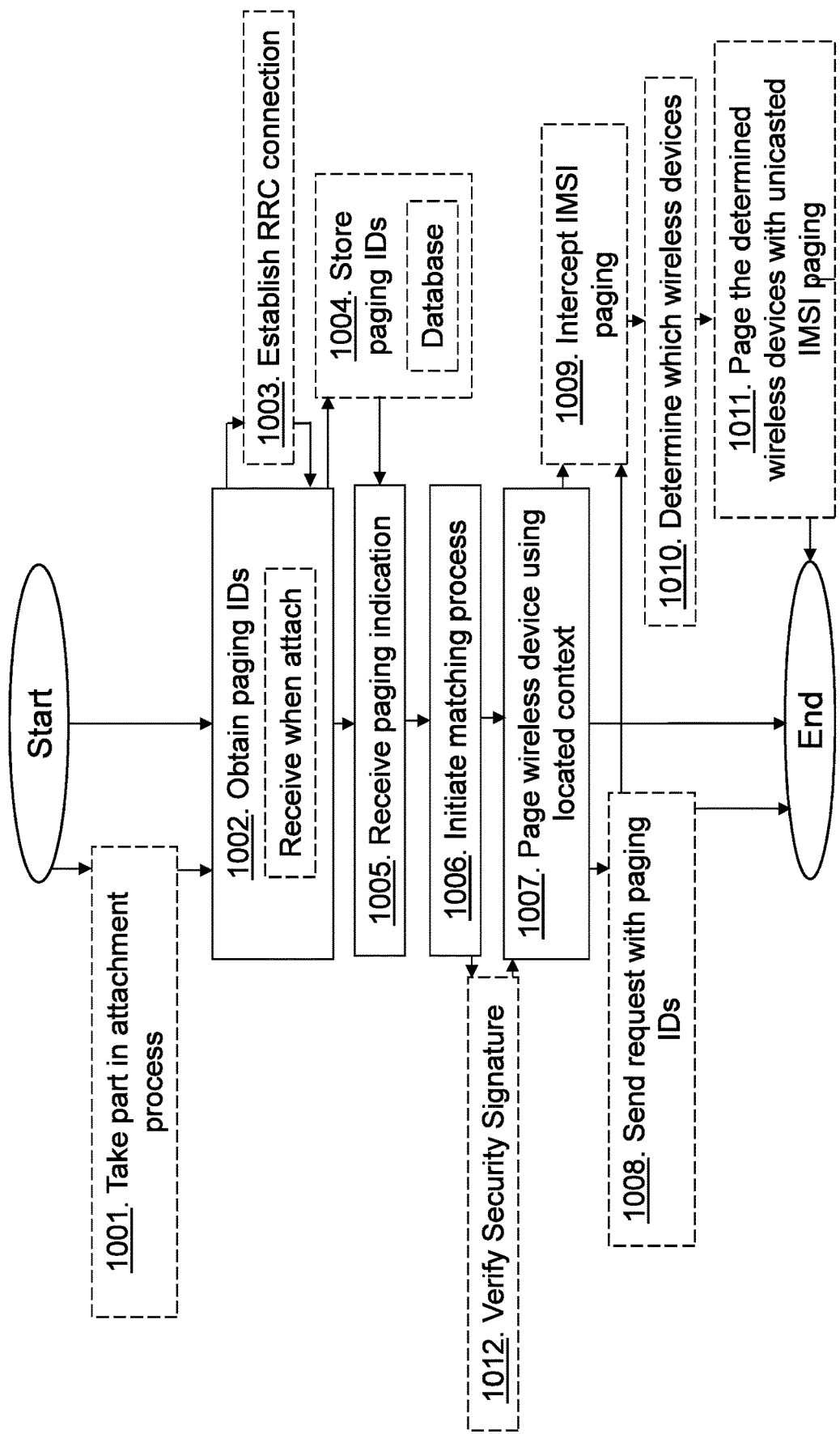
FIG. 10a is a schematic flowchart depicting a method performed by a radio network node according to embodiments herein.

The method actions performed by the first radio network node 12 for enabling the communication for the wireless device 10 in the communication network 1 according to some embodiments will now be described with reference to a flowchart depicted in FIG. 10a. The communication network 1 comprises partitioned sets of functionalities wherein the first set of functionalities belongs to the first network slice, supporting the wireless device 10, of the first core network node 13, and the second set of functionalities belongs to the second network slice, supporting the wireless device 10, of the second core network node 14 or the first core network node 13, i.e. the first and second network slice may be provided from a same core network node or different core network nodes. The first and second sets of functionalities are separated, at least partly, from one another and other sets of functionalities out of a total set of functionalities in the communication network 1.

Action 1001. The first radio network node may take part in an attachment process for the wireless device 10 to the first network slice for providing the first set of functionalities of the first network slice to the wireless device 10, and further connecting or attaching the wireless device 10 to the second network slice for providing the second set of functionalities of the second network slice to the wireless device 10.

Action 1002. The first radio network node 12 obtains the paging identities, e.g. from the wireless device 10 or the first and second core network nodes. The paging identities comprises the first paging identity and the second paging identity of the wireless device 10. The first paging identity is associated with the first network slice and the second paging identity is associated with the second network slice. The first radio network node 12 may obtain the paging identities by receiving the first paging identity when the wireless device 10 is attaching to the first network slice and the second paging identity when the wireless device 10 is further attaching to the second network slice. Each paging identity may comprise a slice identity of the respective network slice. E.g. a paging identity may comprise a combination of S-TMSI and a Slice ID.

Action 1003. The first radio network node 12 may establish a connection, e.g. an RRC connection, for the wireless device 10 to the first network slice connecting the wireless device to the first network slice. The paging identities may in some embodiments be obtained during the RRC establishment.

Action 1004. The first radio network node 12 may then store the obtained paging identities. The first radio network node 12 may store the paging identities locally or it may store the paging identities at a database, externally. E.g. the first radio network node 12 may send the paging identities for the wireless device 10 to the database for storage, the information may be encrypted for security reasons. The information sent to the database may comprise "paging identities", identity of the first radio network node 12 and context in first radio network node 12 for the wireless device 10.

Action 1005. The first radio network node 12 receives the paging indication for the wireless device 10 from the second network slice, when the wireless device 10 is connected to the first network slice. The paging indication comprises the second paging identity of the wireless device 10.

Action 1006. The first radio network node 12 initiates the matching process for matching the second paging identity in the received paging indication to the obtained paging identities for locating context of the wireless device 10, which context is related to the first network slice. E.g. the first radio network node 12 may match the second paging identity to the second paging identity in the obtained paging identities and from the paging identities determine that the wireless device is using the first paging identity in an established RRC connection. This RRC connection comprises context for communication. In some embodiments the first radio network node 12 may initiate the matching process by sending the second paging identity for the wireless device 10 received in the paging indication to the database, also the identity of the first radio network node 12 may be sent to the database. The first radio network node 12 may then receive, from the database, the context or indication of context of the wireless device 10 for the first network slice, the context indication may comprise a context identifier such as a C-RNTI or similar.

Action 1007. The first radio network node 12 pages, upon a match of the matching process, the wireless device 10, connected to the first network slice, for communication with the second network slice by using the located context of the wireless device 10. The context indication may e.g. be used by the radio network node 12 to send the paging to the correct wireless device. The first radio network node 12 may page the wireless device 10 by sending unicast paging over the RRC connection established for the first network slice.

Action 1008. The first radio network node 12 may send, to the second radio network node 15, a request, e.g. handover (HO) request, for performing a handover of the wireless device 10. The request may comprises the paging identities of the wireless device 10. Thus, the first radio network node 12 may forward the obtained paging identities for the wireless device 10 to a target radio network node during a handover procedure.

In case of network failure, an IMSI paging request may be submitted instead of the paging identity described above, as e.g. the second core network node 14 is reset. The first radio network node 12 may then intercept, action 1009, an IMSI paging from the second network slice, and determine, action 1010, which wireless devices served by the radio network node 12 are RRC connected to the first network slice and further merely attached to the second network slice. The first radio network node 12 then pages, action 1011, all the determined wireless device with the IMSI paging unicasted.

According to some embodiments, each paging identity in the obtained paging identities may be associated with a security signature, and the received paging indication further comprises a paging security signature, and the first radio network node may then verify, action 1012, that the security signature for the matched paging identity in the obtained paging identities is the same as the paging security signature before paging the wireless device 10. This is to prevent impersonation and malicious re-direction of pages.

Embodiments herein are based on that the paging identities are unique in the network. This is needed so that a paging wakes up only the intended wireless device 10 on the intended slice. The S-TMSIs values may be used for paging as in existing LTE/EPC system. For this to continue working the S-TMSI value space used in the different network slices need to be coordinated. The S-TMSI is 40 bits long and consists of a MME Code (MMEC) of 8 bits and MME-Temporary Mobile Subscriber Identity (M-TMSI) of 32 bits. The MMEC identifies the MME and, within the MME, the wireless device 10 is identified by the M-TMSI. For each network slice, supported by the same MME, the MME could use a range of the M-TMSI identifiers. Namely, wireless devices registering in one network slice of the MME would receive an S-TMSI with an M-TMSI that points at the specific network slice. One general problem that might be encountered with increasing number of MMEs is that the MMEC range may be too small to accommodate all MMEs.

A solution for this would be to increase the MMEC range. The overall range of the S-TMSI could remain the same because an expansion of e.g. 2 bits in the MMEC range could be implemented with a contraction of the M-TMSI range of e.g. 2 bits. Alternatively, a single MME supporting multiple slices may be assigned multiple MMECs, each MMEC identifying a single network slice. At wireless device registration to each network slice the MME would generate an S-TMSI that is unique per slice because it is the combination of a unique MMEC plus an M-TMSI. In this embodiment it may also be advantageous to extend the MMEC range by adding bits to the MMEC length.

In some embodiment, a "slice id" may be added to the S-TMSI and these jointly create the Paging identity. In this case the above description for the first example applies with the exception that now the MMEC values need to be coordinated only within a network slice. Namely, assuming that slice IDs are coordinated within a network, i.e. that they are uniquely assigned to each slice supported by each MME, this method would allow not to coordinate MMECs between different MMEs but only to coordinate them within an MME. Indeed, even if two MMEs had the same MMEC, the temporary identity generated for the wireless device 10 attaching to a given MME slice would be unique due to the presence of the unique slice ID.

Furthermore, using a permanent wireless device identity per network slice such as a slice specific IMSI, as the paging identity would uniquely identify a specific wireless device, although IMSI paging is normally not preferred.

Figure 10B:
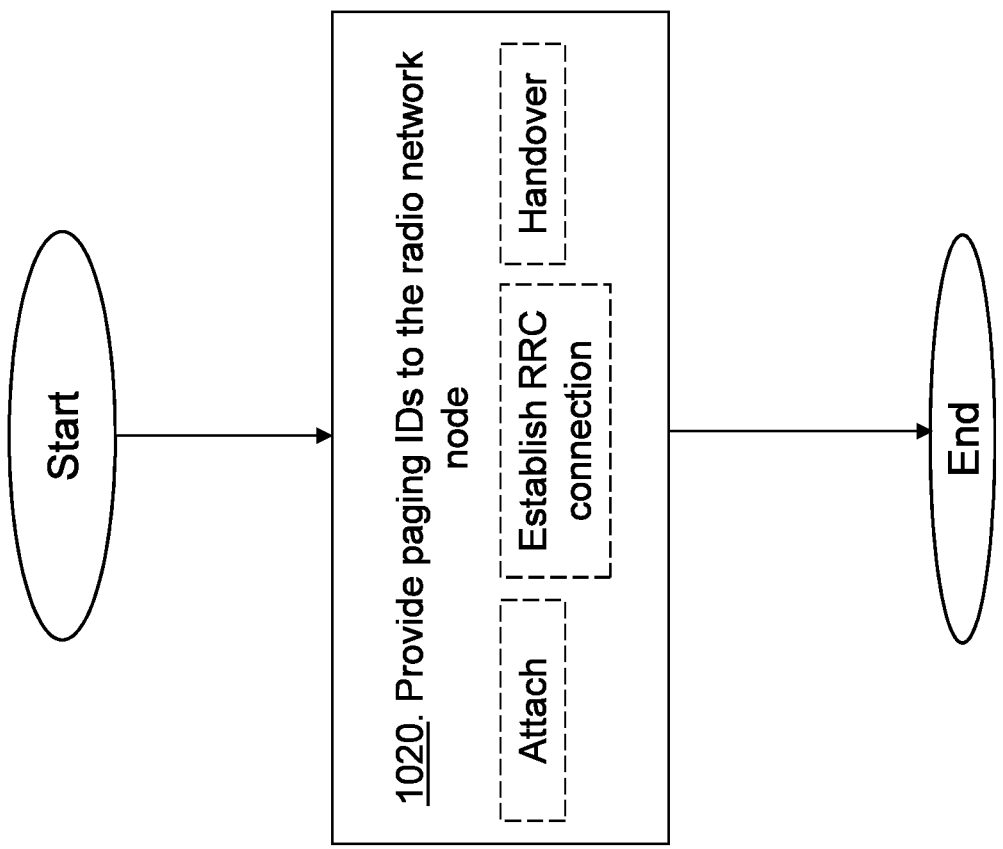
FIG. 10b is a schematic flowchart depicting a method performed by communication device according to embodiments herein.

The paging identities may be provided during different procedures in the setup of the connections. FIG. 10b is depicting a method performed by a communication device, e.g. the wireless device 10 or the first/second core network node 13/14 for enabling communication for the wireless device 10 in the communication network 1. The communication network 1 comprises partitioned sets of functionalities wherein the first set of functionalities belongs to the first network slice, supporting the wireless device 10, of the first core network node 13, and the second set of functionalities belongs to the second network slice, supporting the wireless device 10, of the second core network node 14 or the first core network node 13. The first and second sets of functionalities are separated from one another and other sets of functionalities out of the total set of functionalities in the communication network 1.

Action 1020. The communication device provides to the first radio network node 12 associated with the first and second network slice, paging identities comprising the first paging identity and the second paging identity of the wireless device 10, which first paging identity is associated with the first network slice and the second paging identity is associated with the second network slice. The wireless device 10 and/or the first core network node 13 may transmit to the radio network node 12 the first paging identity when establishing connection, e.g. the wireless device 10 may transmit the paging identity when establishing the RRC connection. The wireless device 10 and/or the first core network node 13 may transmit to the radio network node 12 the first paging identity when the wireless device 10 is attaching to the first network slice. The wireless device 10 and/or the second core network node 14 may transmit to the radio network node 12 the second paging identity when the wireless device 10 is further attaching to the second network slice, see FIG. 12. Each paging identity in the provided paging identities may be associated with a security signature, see FIG. 17. The communication device may provide the paging identities by transmitting to the radio network node 12 the paging identities in relation to handover to the radio network node, e.g. in a handover request, the communication device may then be a source radio network node or a wireless device, see FIG. 13. Each paging identity may comprise the slice identity of the respective network slice.

Figure 11:
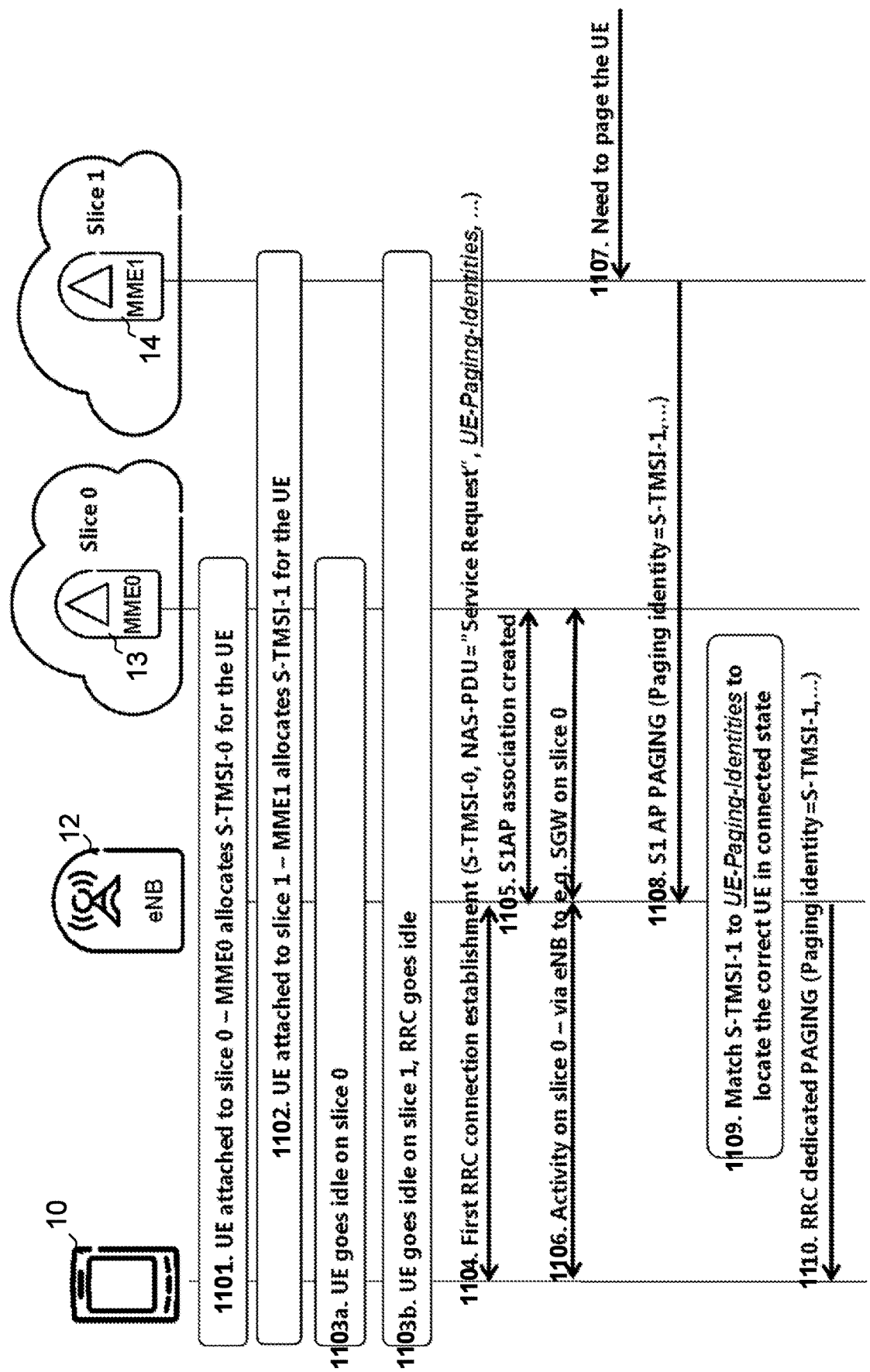
FIG. 11 is a combined flowchart and signalling scheme according to embodiments herein.

FIG. 11 shows an example where the paging identities are provided as part of RRC connection establishment. The first network slice is denoted slice-0 and the second network node is denoted slice-1. MME0 is an example of the first core network node 13 and MME1 is an example of the second core network node 14.

Action 1101. The wireless device 10 (UE) is attached to slice 0-MME0 allocates S-TMSI-0 for the UE.

Action 1102. The wireless device 10 (UE) is attached to slice 1-MME1 allocates S-TMSI-1 for the UE.

Action 1103a. The UE goes idle on Slice 0.

Action 1103b. The UE goes idle on Slice 1, RRC goes idle.

In actions 1101-1103a, 1103b the wireless device 10 is attached to the network slices. Due to e.g. inactivity, the wireless device 10 will enter RRC_IDLE state, and the common RRC connection is released.

Action 1104. An RRC establishment is initiated, a first RRC connection establishment is performed. The paging identities are exchanged with the radio network node 12 in addition to e.g. S-TMSI-0, NAS PDU="service request". In action 1104, when the wireless device 10 initiates the RRC connection to the first radio network node 12, an additional parameter where the "UE-Paging-Identities" i.e. all paging identities allocated to the wireless device 10, is included in the RRC signaling from the wireless device 10 to the first radio network node 12. The first radio network node 12 may associate a context identifier such as the Cell Radio Network Temporary Identity (C-RNTI) with the list of Paging Identities. For security reasons, this additional parameter may be transmitted after RRC connection has been secured, i.e. after security mode command.

Action 1105. The radio network node 12 creates an S1AP association to the first core network node 13.

Action 1106. Activity on Slice 0—via radio network node to e.g. SGW on slice 0.

Action 1107. The second core network node 14 may receive an indication that there is a need to page the UE, i.e. the wireless device 10.

Action 1108. The second core network node 14 sends a paging indication such as a S1 AP paging message to the radio network node 12. The paging indication comprises paging identity of the wireless device 10 associated to the second core network node 14 e.g. S-TMSI-1. In action 1108, when S1AP paging from slice-1 arrives to the first radio network node 12 with identifier S-TMSI, the first radio network node 12 checks all active wireless devices and locates the correct wireless device based on the stored "UE-Paging-Identities".

Action 1109. The first radio network node 12 matches S-TMSI-1 to UE-paging-identities to locate the correct UE in connected state.

Action 1110. The first radio network node 12 transmits the paging message to the wireless device 10 for the second network slice using the RRC connection. Thus, if there is a match, this paging message will also be transmitted to the matched dedicated RRC connection such as a RRC dedicated PAGING with paging identity set to S-TMSI-1. If there is no match, the paging message may be broadcasted as normally.

Figure 12:
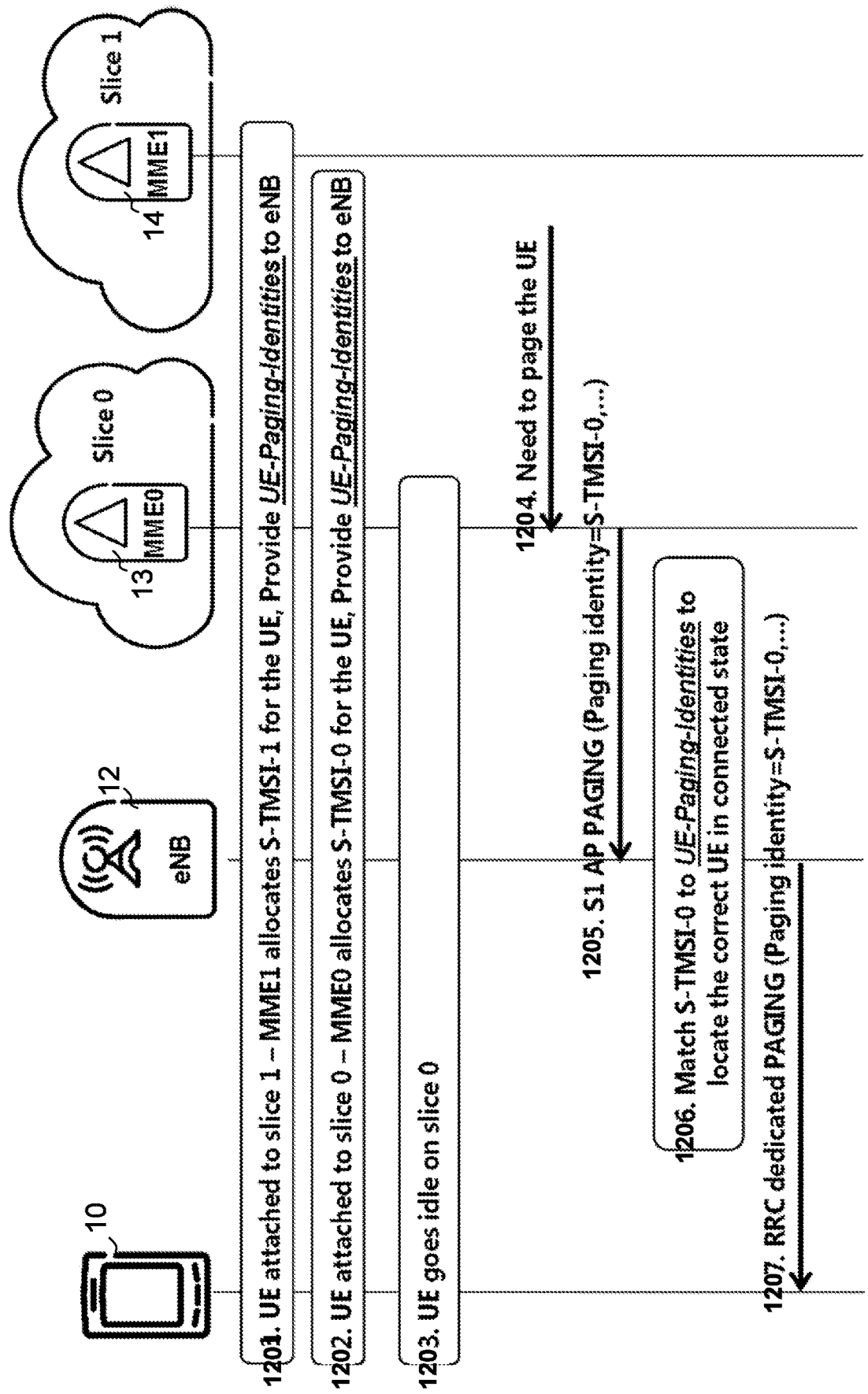
FIG. 12 is a combined flowchart and signalling scheme according to embodiments herein.

FIG. 12 shows an example where the paging identities are provided over an existing RRC connection. The first network slice is denoted slice-0 and the second network node is denoted slice-1. MME0 is an example of the first core network node 13 and MME1 is an example of the second core network node 14.

Action 1201. The wireless device 10 (UE) is attached to slice 1-MME1 allocates S-TMSI-1 for the UE. Furthermore, UE-paging-identities for the wireless device 10 is provided to the radio network node 12 (UE).

Action 1202. The wireless device 10 (UE) is attached to slice 0-MME0 allocates S-TMSI-0 for the UE. Furthermore, UE-paging-identities for the wireless device 10 is provided to the radio network node 12 (UE).

Action 1203. The UE goes idle on Slice 0.

Action 1204. The first core network node 13 may receive an indication that there is a need to page the UE, i.e. the wireless device 10.

Action 1205. The first core network node 13 sends a paging indication such as a S1 AP paging message to the radio network node 12. The paging indication comprises paging identity of the wireless device 10 associated to the first core network node 13 e.g. S-TMSI-0. In action 1205, when S1AP paging from slice-0 arrives to the first radio network node 12 with identifier S-TMSI-0, the first radio network node 12 checks all active wireless devices and locates the correct wireless device based on the stored "UE-Paging-Identities".

Action 1206. The first radio network node 12 matches S-TMSI-0 to UE-paging-identities to locate the correct UE in connected state.

Action 1207. The first radio network node 12 transmits the paging message to the wireless device 10 for the first network slice. Thus, if there is a match, this paging message will also be transmitted to the matched dedicated RRC connection such as a RRC dedicated PAGING with paging identity set to S-TMSI-0. If there is no match, the paging message may be broadcasted as normally.

This variant is a special case that happens when the wireless device 10 remains in RRC_CONNECTED state while the wireless device 10 first attaches to the first and the second network slice (actions 1201,1202) and then goes idle on the first network slice (actions 1203), and then is paged on that first network slice (actions 1204). As there is no RRC connection establishment informing the first radio network node 12 about the Paging Identity for the first network slice, the paging would today fail. Therefore, the addition is that the paging identities are sent by the wireless device 10 to the first radio network node 12 whenever a new Paging identity is allocated to the wireless device 10. One example is as following:

Actions 1201-1202. The wireless device 10 attaches to slice 0 and slice 1 directly after each other, RRC connection is established and maintained for the duration of the example. When the wireless device 10 attaches to slice 0, a new paging identity for slice 0 is allocated to the wireless device 10. A new RRC signaling is triggered from the wireless device to inform the first radio network node 12 about the allocated "UE-Paging-Identities".

Action 1203. One of the network slices enters idle state, in the example in FIG. 12 it is slice 0. RRC is still in connected state. The wireless device goes idle on slice 0.

At this stage, the first radio network node 12 needs to know the associations with the "UE-Paging-Identities" mapping to this active RRC connection. Therefore, in case wireless device 10 is being attached on a network slice or any other case when a new paging identity is allocated for the wireless device 10, for example after a successful Attach, Tracking Area Update or Globally Unique Temporary UE Identity (GUTI) Reallocation, the information about paging identities may be stored in the first radio network node 12, actions 1201 and 1202 above. New RRC signaling may be triggered from the wireless device 10 to inform the first radio network node 12 about the allocated "UE-Paging-Identities".

In another embodiment the MME, i.e. the first/second core network node, can provide new per slice identities such as S-TMSIs through S1AP signalling to the first radio network node 12.

Figure 13:
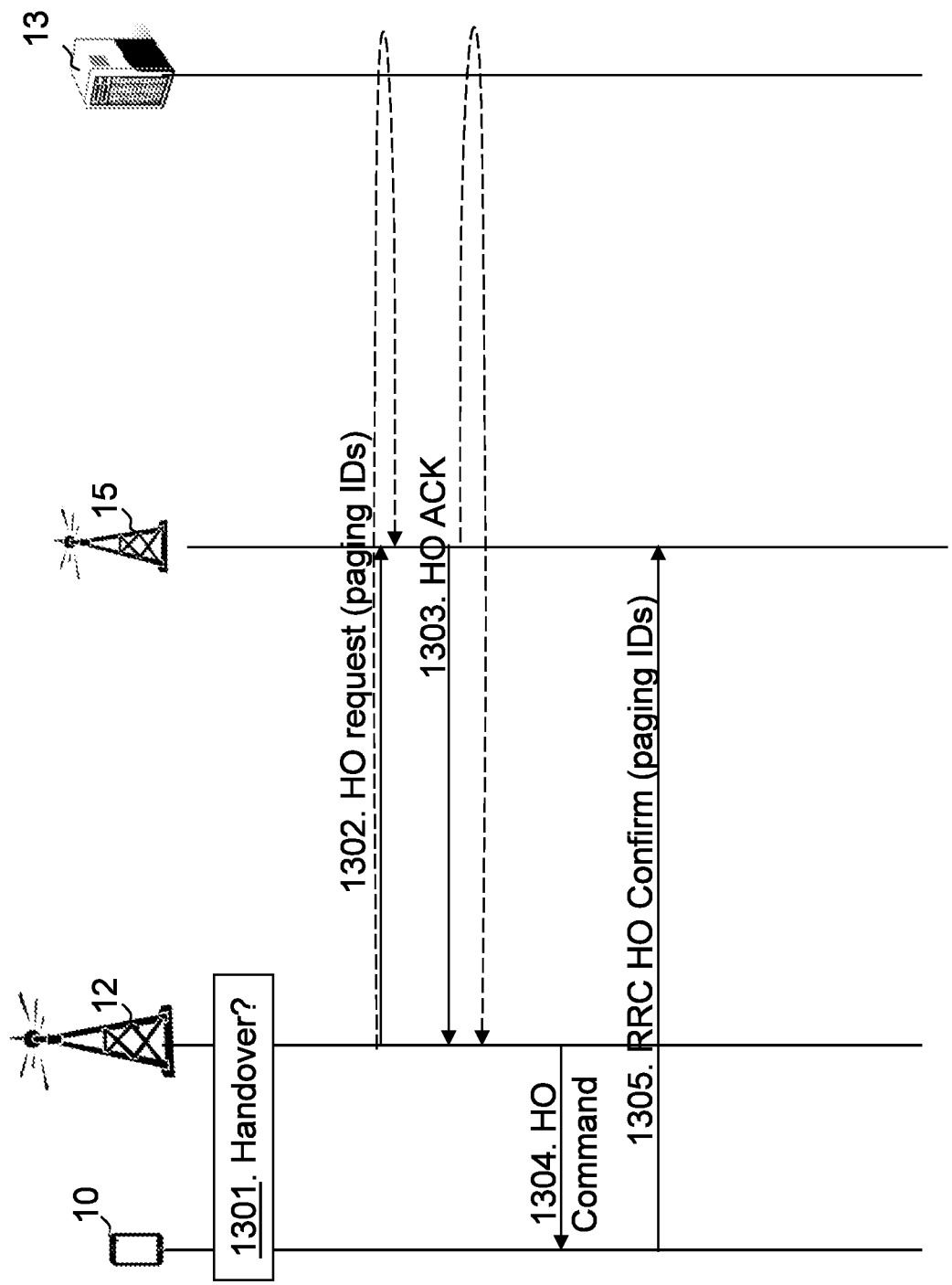
FIG. 13 is a combined flowchart and signalling scheme according to embodiments herein.

FIG. 13 discloses an example where, during handover, the "UE-Paging-Identities" are transferred to target eNB (T-eNB) i.e. the second radio network node 15. As this association is available on both Source eNB (S-eNB) i.e. the first radio network node 12 and the wireless device 10, two variants are available.

The first variant is to transfer the information from S-eNB to T-eNB. In case of X2 handover, the association (i.e. the list of paging identities) can be transferred to the second radio network node 15 as a new parameter in the X2 Handover Request.

In action 1301 the wireless device 10 may report measurements that may be triggered by handover conditions being met.

In actions 1302 and 1303 the handover preparation procedures are carried out. As part of a HO request message (see action 1302) the "UE-Paging-Identities" may be added either as new information of the X2-Handover Request message or as part of the information contained in the RRC Container IE, which carries important information regarding the AS context of the wireless device 10 in the source eNB. In case of S1 handover, the "UE-Paging-Identities" may be first transmitted to the slice MME using S1AP:S1 handover Required, and then the slice MME will forward the "UE-Paging-Identities" to T-eNB through S1AP: Handover Request. This is illustrated as a dashed line in FIG. 13 action 1302. The action 1302 is used to transfer information from S-eNB to T-eNB via the first core network node 13, see dashed line. The "UE-Paging-Identities" may be either added as new information of the S1AP Handover Required message and S1AP Handover Request message, or they can be added as part of the RRC container included in the S1AP Handover Required message and S1AP Handover Request message, such container being transparent to the first core network node 13. Confirmation message such as an acknowledgement (ACK) may be transmitted over the first core network node 13, see action 1303, in a similar manner.

Action 1304 shows the first radio network node 12 transmitting a HO command to the wireless device 10. A "RRC Handover command" message that may be realized by using a RRC Connection Reconfiguration message.

Action 1305 shows a "RRC Handover Confirm" message that may be realized by using a RRC Connection Reconfiguration Complete message. This message may alternatively comprise the paging identities from the wireless device 10, i.e., the wireless device 10 may transmit the "UE-Paging-Identities" to the T-eNB. For both X2 handover and S1 handover, this can be realized by introducing new parameter on the RRC Handover Confirm (RRConnectionReconfigurationComplete) message.

Figure 14:
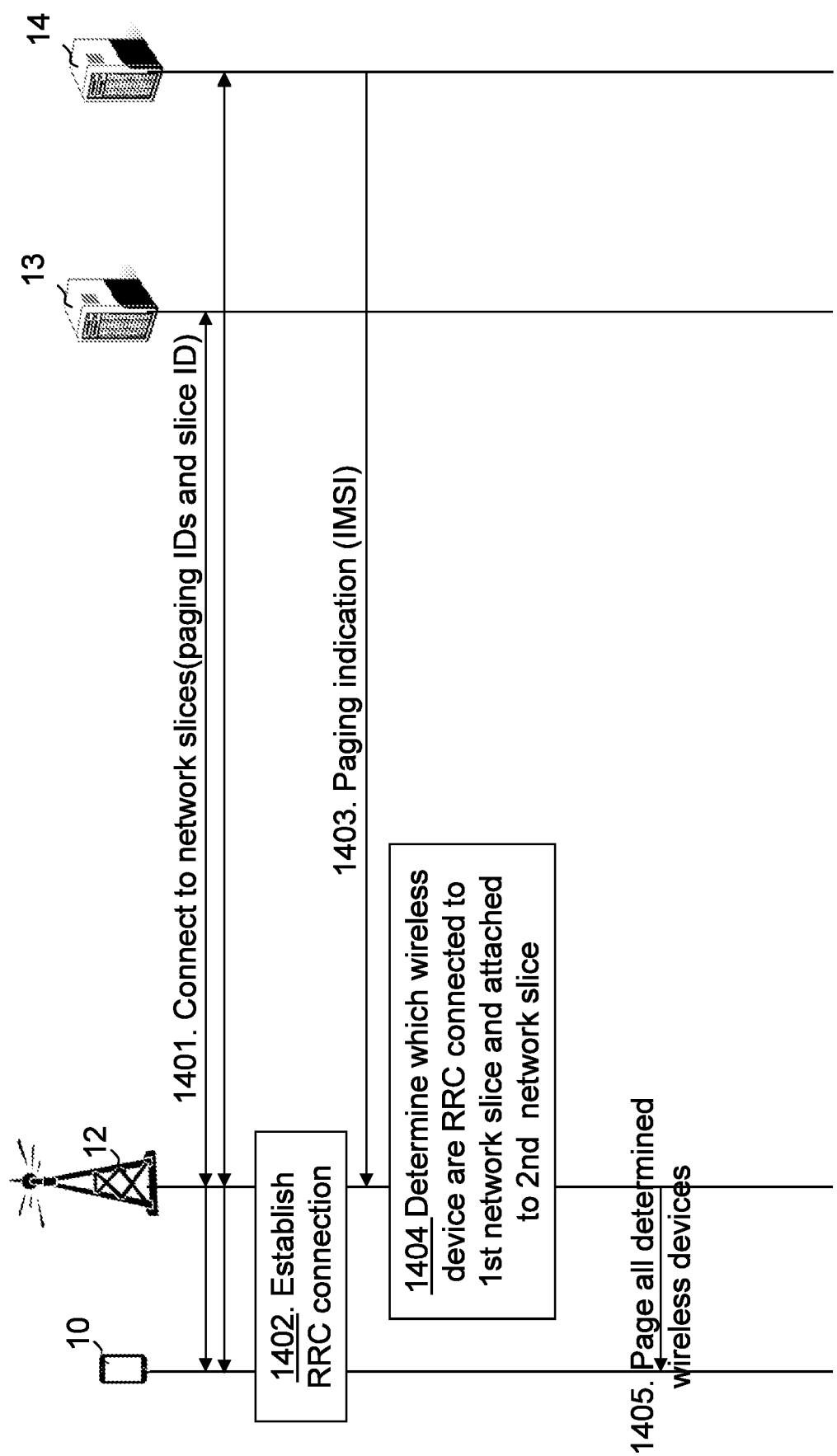
FIG. 14 is a combined flowchart and signalling scheme according to embodiments herein.

FIG. 14 shows an embodiment in case of network failure in the core network nodes, where an IMSI paging request will be submitted instead of the paging identity described above. As the first radio network node 12 has no IMSI—wireless device association, the first radio network node 12 may in this case perform certain actions.

Action 1401. The wireless device 10 connects to the different network slices (exchanging paging IDs and slice IDs).

Action 1402. The wireless device 10 may after being in RRC_Idle state establish an RRC connection with the first radio network node 12.

Action 1403. A network failure occurs in the second core network node and the first radio network node 12 may intercept the IMSI paging from the second core network node 14, i.e. a paging indication with IMSI. In this case it is assumed that the wireless device 10 has different IMSIs, or other permanent wireless device identifiers, in the different network slices.

Action 1404. The Check is performed for determining which of the wireless device fulfills e.g. the following conditions:
  a. In a RRC_CONNECTED state e.g. RRC connected to the first network slice.
  b. Is attached (=in EMM_REGISTERED state) to that particular network slice where the page comes from i.e. attached to the second network slice.
  c. Is in ECM_IDLE state to that particular slice where the page comes from.

Action 1405. Page all determined wireless devices. Transmit IMSI paging inband to those wireless devices which fulfill the above conditions.

In case of a paging request (using IMSI) from a network slice arrives to the first radio network node 12, the first radio network node 12 will intercept the page, and check if there is any RRC Active wireless devices which reported identities for the same network slice for which the IMSI based paging is generated but for which the wireless device is attached but not in ECM connected state. If such wireless devices are detected, the paging request will be sent to these wireless devices inband, e.g. in dedicated channels.

For this extension, wireless device 10 is required to provide slice ID on all attached network slices to the first radio network node 12 together with the "UE-Paging-Identities"

Figure 15:
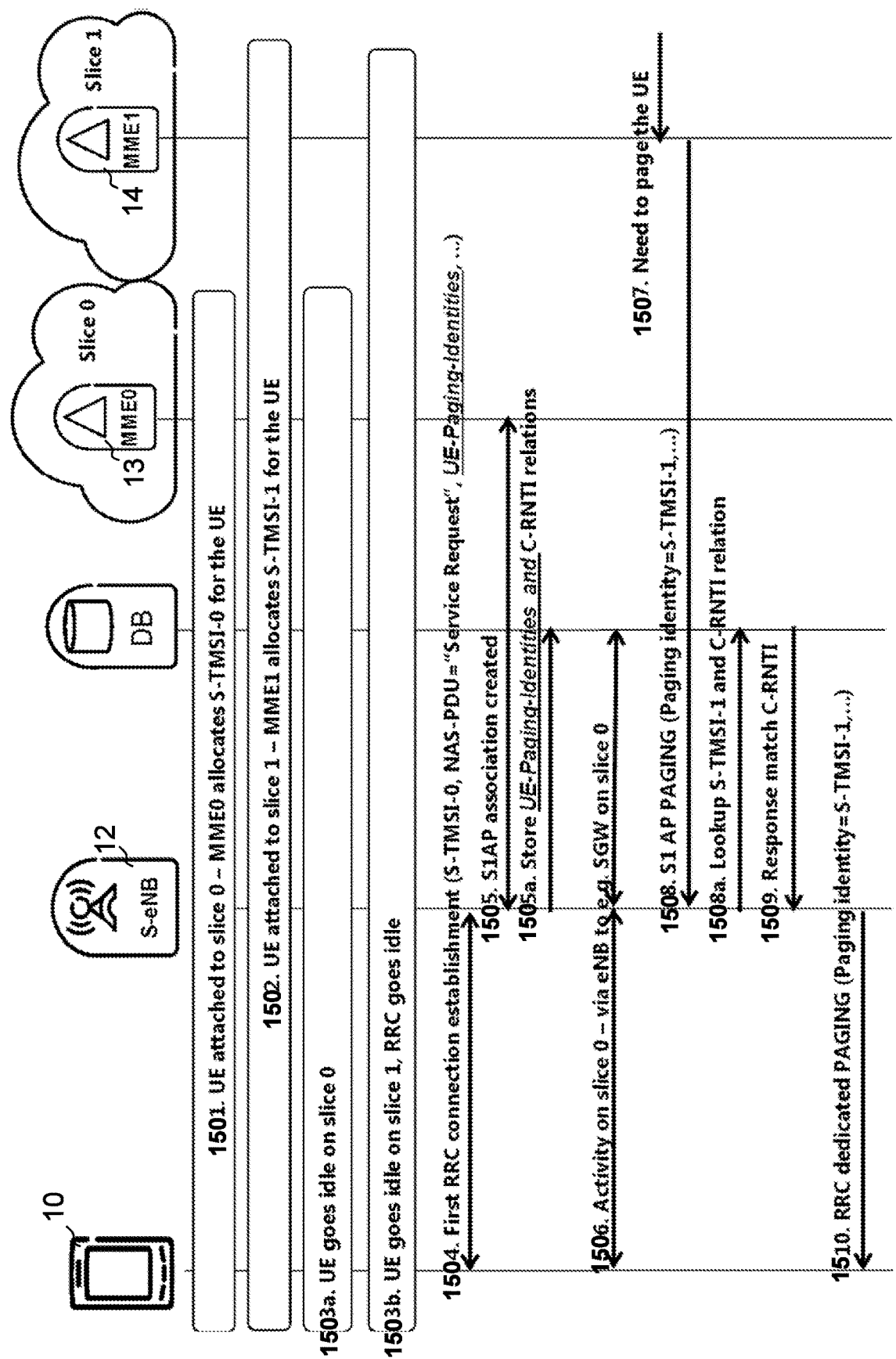
FIG. 15 is a combined flowchart and signalling scheme according to embodiments herein.

FIG. 15 shows an embodiment for improving the security by storing the paging identities in a database. From a security point of view, adding the actual S-TMSI value to the context stored in the first radio network node 12 and used during handovers may require additional security consideration. One such solution is to store the UE-Paging-Identities outside the first radio network node 12, in a more secure location such as a database.

The first network slice is denoted slice-0 and the second network node is denoted slice-1. MME0 is an example of the first core network node 13 and MME1 is an example of the second core network node 14.

Action 1501. The wireless device 10 (UE) is attached to slice 0-MME0 allocates S-TMSI-0 for the UE.

Action 1502. The wireless device 10 (UE) is attached to slice 1-MME1 allocates S-TMSI-1 for the UE.

Action 1503a. The UE goes idle on Slice 0.

Action 1503b. The UE goes idle on Slice 1, RRC goes idle.

In actions 1501-1503a, 1503b the wireless device 10 is attached to the network slices. Due to e.g. inactivity, the wireless device 10 will enter RRC_IDLE state, and the common RRC connection is released.

Action 1504. An RRC establishment is initiated, a first RRC connection establishment is performed. The paging identities are exchanged with the radio network node 12 in addition to e.g. S-TMSI-0, NAS PDU="service request". In action 1504, when the wireless device 10 initiates the RRC connection to the first radio network node 12, an additional parameter where the "UE-Paging-Identities" i.e. all paging identities allocated to the wireless device 10, is included in the RRC signaling from the wireless device 10 to the first radio network node 12. The first radio network node 12 may associate a context identifier such as the C-RNTI with the list of Paging Identities. For security reasons, this additional parameter may be transmitted after RRC connection has been secured, i.e. after security mode command.

Action 1505. The radio network node 12 creates an S1AP association to the first core network node 13.

Action 1505a. The first radio network node 12 may store the UE-paging-identities and C-RNTI relations as the database. FIG. 15 shows the case when the UE-Paging-Identities are stored in the external database in action 1505a, and associated with the C-RNTI.

Action 1506. Activity on Slice 0—via radio network node to e.g. SGW on slice 0.

Action 1507. The second core network node 14 may receive an indication that there is a need to page the UE, i.e. the wireless device 10.

Action 1508. The second core network node 14 sends a paging indication such as a S1 AP paging message to the radio network node 12. The paging indication comprises paging identity of the wireless device 10 associated to the second core network node 14 e.g. S-TMSI-1.

Action 1508a. The first radio network node 12 may perform a lookup towards the database to retrieve the C-RNTI based on the paging identity (S-TMSI-1) received in action 1508 from the second core network node 14. The C-RNTI can then be used to locate the context and the related RRC connection in the first radio network node 12. This variant may work as long as the database is per radio network node, as the C-RNTI is only unique within an radio network node. If there is a need to have common database for multiple radio network nodes then the radio network node ID also needs to be stored together with the C-RNTI, and also used in lookups towards the database.

In another alternative, the C-RNTI could be replaced with any other wireless device specific identifier within the first radio network node such as the identifier of the S1AP association on the S1-MME interface e.g. "eNB UE S1AP ID", possibly combined also with the "MME UE S1AP ID" for the same S1AP association. As above the radio network node-ID may be needed in the case the common database supports multiple radio network nodes. Finally, this last option also assumes that the "eNB UE S1AP IDs" are unique within the radio network node even when the radio network node has multiple S1-MME interfaces towards multiple core network nodes.

Action 1509. The database sends the response of the matched C-RNTI to the first radio network node 12.

Action 1510. The first radio network node 12 transmits the paging message to the wireless device 10 for the second network slice using the RRC connection. Thus, if there is a match, this paging message will also be transmitted to the matched dedicated RRC connection such as a RRC dedicated PAGING with paging identity set to S-TMSI-1.

Figure 16:
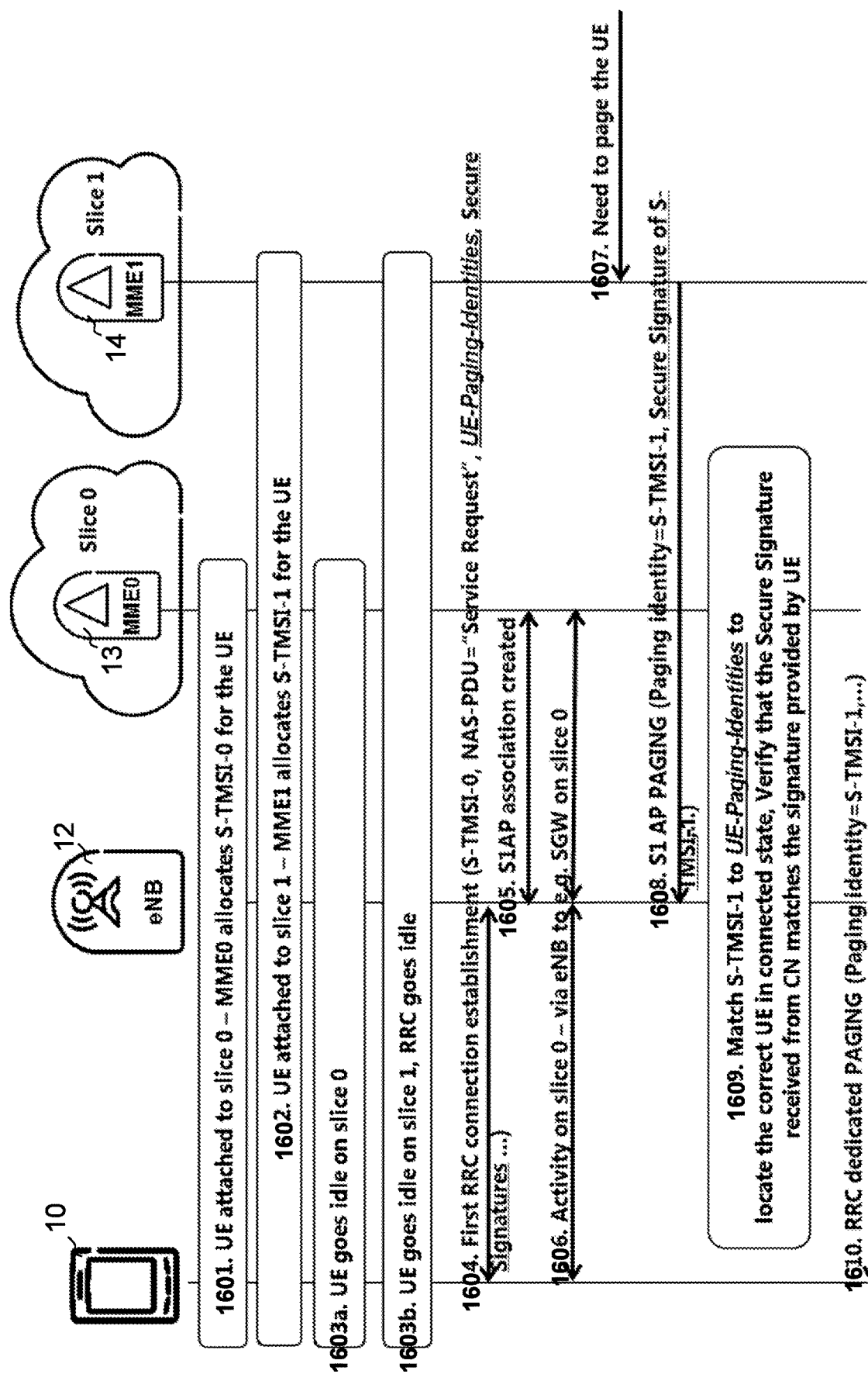
FIG. 16 is a combined flowchart and signalling scheme according to embodiments herein.

FIG. 16 shows embodiments for preventing malicious wireless devices from re-directing pages aimed to other wireless devices. A basic solution for preventing malicious wireless devices from re-directing pages aimed to other users by providing UE-Paging-Identities associated with those wireless devices is for the first radio network node 12 intercepting pages to the malicious wireless device to also transmit the paging using normal paging channel. In this way the other wireless devices would still receive the page and is able to respond to the page. This solution may however be further enhanced by introducing the security signature associated with each paging identity in UE-Paging-Identities. The security signature can be calculated using a shared secret between wireless device 10 and the core network node that allocated the paging identity. The shared secret may include NAS keys, NAS integrity checksum etc. In this solution the CN can provide the same security signature, denoted paging security signature, to the first radio network node 12 when performing paging making it possible for the first radio network node 12 to verify if a page should be intercepted and if the page is verified the first radio network node 12 node does not need to broadcast the page. The security signatures also need to be provided to the target eNB at handover, using similar solutions as for the UE-Paging-Identities.

The first network slice is denoted slice-0 and the second network node is denoted slice-1. MME0 is an example of the first core network node 13 and MME1 is an example of the second core network node 14.

Action 1601. The wireless device 10 (UE) is attached to slice 0-MME0 allocates S-TMSI-0 for the UE.

Action 1602. The wireless device 10 (UE) is attached to slice 1-MME1 allocates S-TMSI-1 for the UE.

Action 1603*a*. The UE goes idle on Slice 0.

Action 1603*b*. The UE goes idle on Slice 1, RRC goes idle.

In actions 1601-1603*a*, 1603*b* the wireless device 10 is attached to the network slices. Due to e.g. inactivity, the wireless device 10 will enter RRC_IDLE state, and the common RRC connection is released.

Action 1604. An RRC establishment is initiated, a first RRC connection establishment is performed. The paging identities with the secure or security signatures are exchanged with the radio network node 12 in addition to e.g. S-TMSI-0, NAS PDU="service request". In action 1604, when the wireless device 10 initiates the RRC connection to the first radio network node 12, an additional parameter where the "UE-Paging-Identities" i.e. all paging identities allocated to the wireless device 10, is included in the RRC signaling from the wireless device 10 to the first radio network node 12. The first radio network node 12 may associate a context identifier such as the C-RNTI with the list of Paging Identities. For security reasons, this additional parameter may be transmitted after RRC connection has been secured, i.e. after security mode command.

Action 1605. The radio network node 12 creates an S1AP association to the first core network node 13.

Action 1606. Activity on Slice 0—via radio network node to e.g. SGW on slice 0.

Action 1607. The second core network node 14 may receive an indication that there is a need to page the UE, i.e. the wireless device 10.

Action 1608. The second core network node 14 sends a paging indication such as a S1 AP paging message to the radio network node 12. The paging indication comprises paging identity of the wireless device 10 associated to the second core network node 14 e.g. S-TMSI-1 and the secure signature of S-TMSI-1.

Action 1609. The first radio network node 12 matches S-TMSI-1 to UE-paging-identities to locate the correct UE in connected state. Furthermore, the first radio network node 12 verifies that secure signature received from the second core network node 14 matched the signature provided by the wireless device (UE).

Action 1610. The first radio network node 12 transmits the paging message to the wireless device 10 for the second network slice using the RRC connection. Thus, if there is a match and verification of the secure signature, this paging message will also be transmitted to the matched dedicated RRC connection such as a RRC dedicated PAGING with paging identity set to S-TMSI-1.

Figure 17:
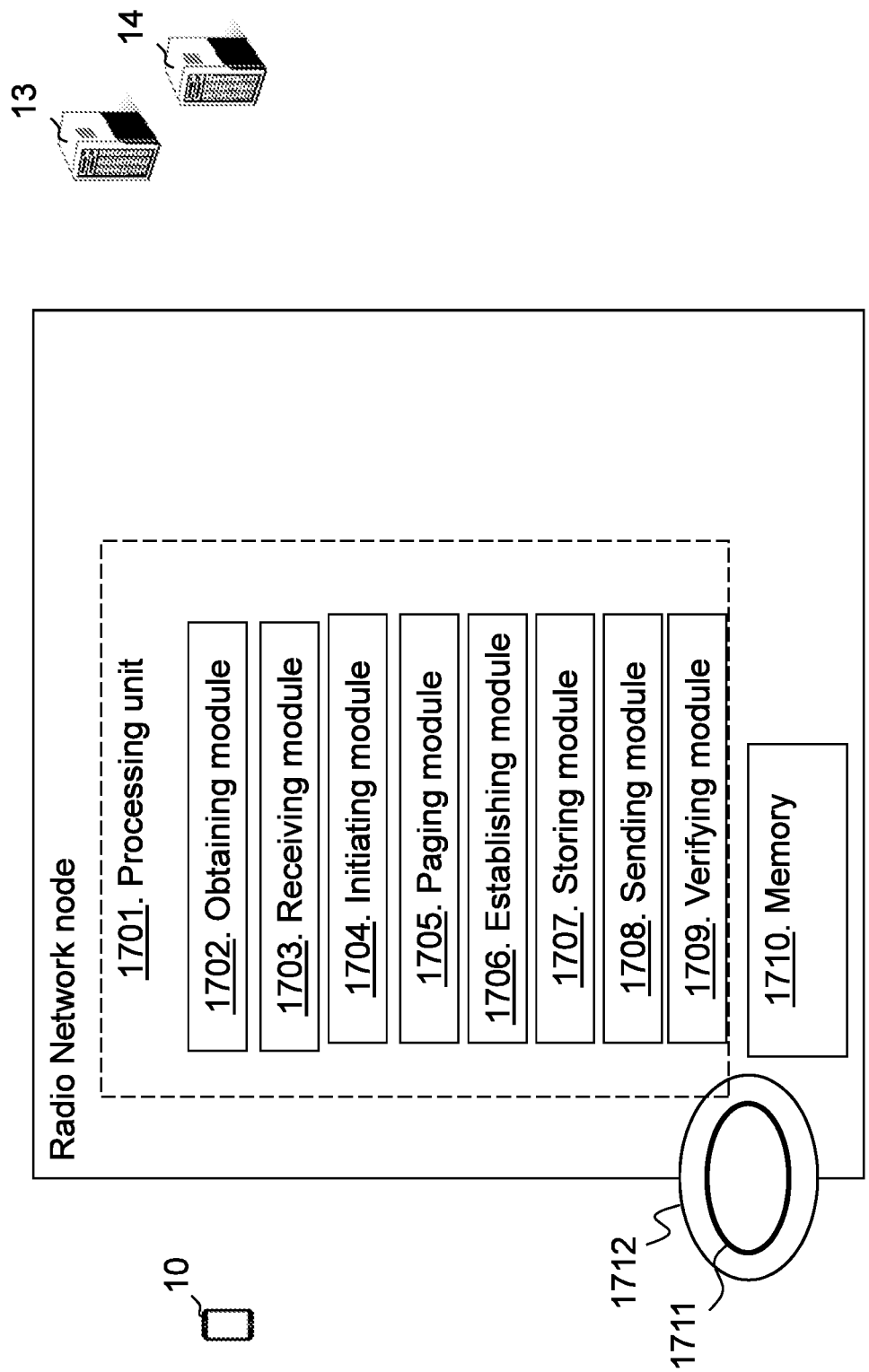
FIG. 17 is a block diagram depicting a radio network node according to embodiments herein.

FIG. 17 is a block diagram depicting the radio network node also referred to herein as the first radio network node 12 for enabling communication for the wireless device in the communication network 1. The communication network comprises partitioned sets of functionalities wherein the first set of functionalities belongs to the first network slice, supporting the wireless device, of the first core network node 13, and the second set of functionalities belongs to the second network slice, supporting the wireless device 10, of the second core network node 14 or the first core network node 13, and which first and second sets of functionalities are separated from one another and other sets of functionalities out of the total set of functionalities in the communication network 1.

The radio network node may comprise a processing unit 1701, e.g. one or more processors, configured to perform the methods herein. The radio network node may comprise an obtaining module 1702. The radio network node, the processing unit 1701, and/or the obtaining module 1702 may be configured to obtain paging identities comprising the first paging identity and the second paging identity of the wireless device 10, which first paging identity is associated with the first network slice and the second paging identity is associated with the second network slice. The radio network node, the processing unit 1701, and/or the obtaining module 1702 may be configured to obtain the paging identities by being configured to receive the first paging identity when the wireless device 10 is attaching to the first network slice and the second paging identity when the wireless device 10 is further attaching to the second network slice. Each paging identity may comprise a slice identity of the respective network slice.

The radio network node may comprise a receiving module 1703. The radio network node, the processing unit 1701, and/or the receiving module 1703 may be configured to receive the paging indication for the wireless device 10 from the second network slice, when the wireless device 10 is connected to the first network slice, which paging indication comprises the second paging identity of the wireless device 10.

The radio network node may comprise an initiating module 1704. The radio network node, the processing unit 1701, and/or the initiating module 1704 may be configured to initiate the matching process for matching the second paging identity in the received paging indication to the obtained paging identities for locating context of the wireless device 10, which context is related to the first network slice.

The radio network node may comprise a paging module 1705. The radio network node, the processing unit 1701, and/or the paging module 1705 may be configured to page, upon the match of the matching process, the wireless device 10, connected to the first network slice, for communication with the second network slice by using the located context of the wireless device 10. The radio network node, the processing unit 1701, and/or the paging module 1705 may be configured to page the wireless device 10 by being configured to send a unicast paging over a connection, e.g. RRC connection, established for the first network slice.

The radio network node may comprise an establishing module 1706. The radio network node, the processing unit 1701, and/or the establishing module 1706 may be configured to establish the connection for the wireless device 10 to the first network slice connecting the wireless device 10 to the first network slice.

The radio network node may comprise a storing module 1707. The radio network node, the processing unit 1701, and/or the storing module 1707 may be configured to store the paging identities for the wireless device 10. The radio network node, the processing unit 1701, and/or the storing module 1707 may be configured to store the paging identities by being configured to send the paging identities for the wireless device to the database for storage, and the radio network node, the processing unit 1701, and/or the initiating module 1704 may then be further configured to initiate the matching process by being configured to send the second paging identity to the database and to receive the context or indication of the context of the wireless device 10.

The radio network node may comprise a sending module 1708. The radio network node, the processing unit 1701, and/or the sending module 1708 may be configured to send the request, to the second radio network node 15, for performing the handover of the wireless device, which request comprises the paging identities of the wireless device 10.

The radio network node may comprise a verifying module 1709. Each paging identity in the obtained paging identities may be associated with a security signature, and the received paging indication further comprises a paging security signature, and the radio network node, the processing unit 1701 and/or the verifying module 1709 may be configured to verify that the security signature of the matched paging identity in the obtained paging identities is the same as the paging security signature before paging the wireless device 10.

The radio network node and/or the processing unit 1701 may be configured to intercept the IMSI paging from the second network slice; determine which wireless devices served by the radio network node are Radio Resource Control, RRC, connected to the first network slice and further attached to the second network slice; and to page, all the determined wireless device with the IMSI paging unicasted.

The radio network node further comprises a memory 1710. The memory comprises one or more units to be used to store data on, such as sets of functionalities, indications, list of paging identities, identities of network slices, context, identities, signaling measurements, applications to perform the methods disclosed herein when being executed, and/or similar.

The methods according to the embodiments described herein for the radio network node are respectively implemented by means of e.g. a computer program 1711 or a computer program product, comprising instructions, i.e., software code portions, which, when executed on at least one processor, cause the at least one processor to carry out the actions described herein, as performed by the radio network node. The computer program 1711 may be stored on a computer-readable storage medium 1712, e.g. a disc or similar. The computer-readable storage medium 1712, having stored thereon the computer program, may comprise the instructions which, when executed on at least one processor, cause the at least one processor to carry out the actions described herein, as performed by the radio network node. In some embodiments, the computer-readable storage medium may be a non-transitory computer-readable storage medium.

Figure 18:
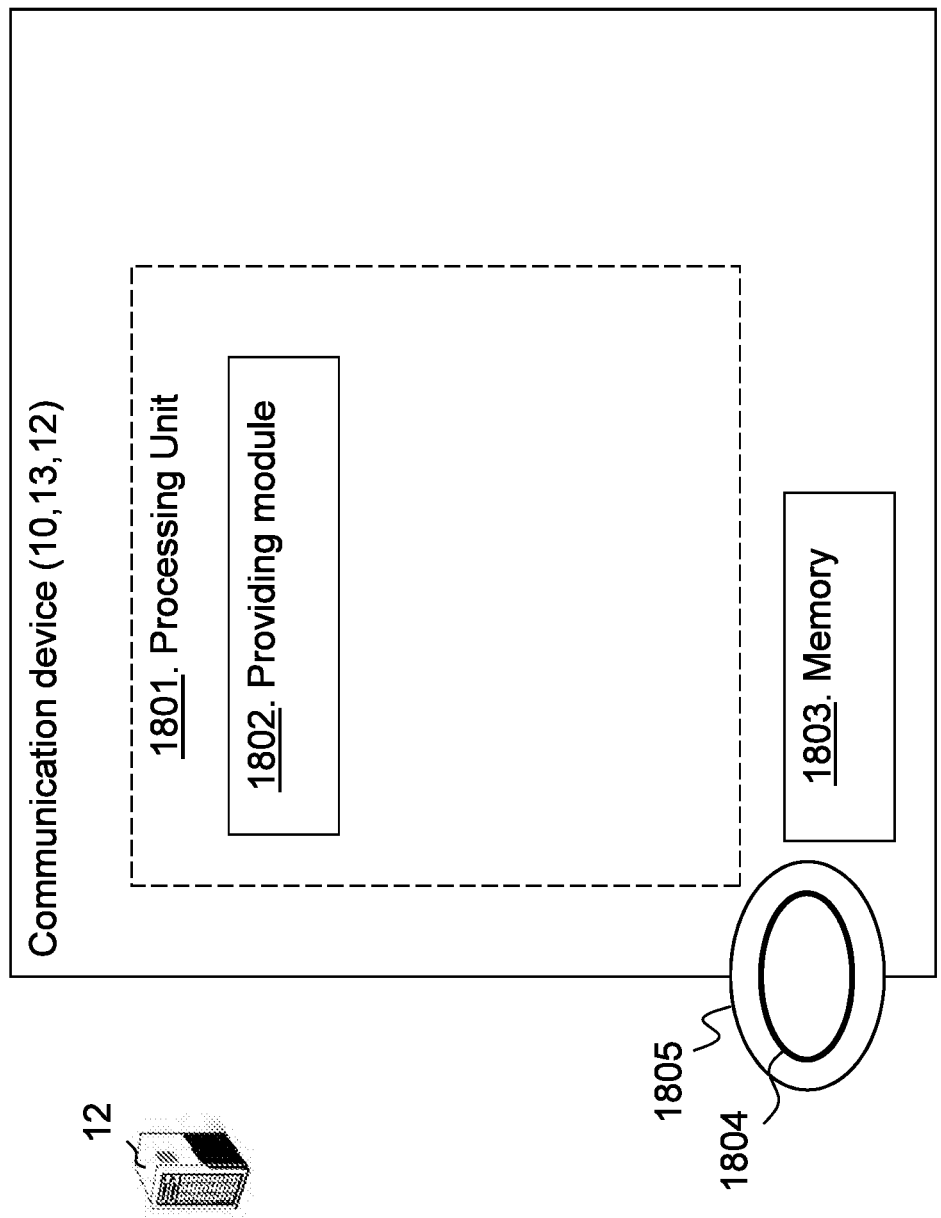
FIG. 18 is a block diagram depicting a communication device according to embodiments herein.

FIG. 18 is a block diagram depicting the communication device, e.g. the wireless device 10, the first core network node (when hosting both network slices) or the first radio network node 12 (source eNB), for enabling communication for the wireless device in the communication network 1. The communication network 1 comprises partitioned sets of functionalities wherein the first set of functionalities belongs to the first network slice, supporting the wireless device 10, of the first core network node 13, and the second set of functionalities belongs to the second network slice, supporting the wireless device 10, of the second core network node 14 or the first core network node 13. The first and second sets of functionalities are separated from one another and other sets of functionalities out of the total set of functionalities in the communication network 1.

The communication device may comprise a processing unit 1801, e.g. one or more processors, configured to perform the methods herein. The communication device may comprise a providing module 1802. The communication device, the processing unit 1801, and/or the providing module 1802 may be configured to provide, to a radio network node associated with the first and second network slice, paging identities comprising a first paging identity and a second paging identity of the wireless device 10. The first paging identity is associated with the first network slice and the second paging identity is associated with the second network slice. The communication device, the processing unit 1801, and/or the providing module 1802 may be configured to transmit to the radio network node 12 the first paging identity when the wireless device 10 is attaching to the first network slice and the second paging identity when the wireless device 10 is further attaching to the second network slice. The communication device, the processing unit 1801, and/or the providing module 1802 may be configured to provide the paging identities by being configured to transmit to the radio network node 12 the paging identities when establishing a radio resource control connection. The communication device, the processing unit 1801, and/or the providing module 1802 may be configured to provide the paging identities by being configured to transmit to the radio network node 12 the paging identities in relation to handover to the radio network node 12.

The communication device further comprises a memory 1803. The memory comprises one or more units to be used to store data on, such as sets of functionalities, indications, list of paging identities, identities of network slices, context, identities, signaling measurements, applications to perform the methods disclosed herein when being executed, and/or similar.

The methods according to the embodiments described herein for the communication device are respectively implemented by means of e.g. a computer program 1804 or a computer program product, comprising instructions, i.e., software code portions, which, when executed on at least one processor, cause the at least one processor to carry out the actions described herein, as performed by the communication device. The computer program 1804 may be stored on a computer-readable storage medium 1805, e.g. a disc or similar. The computer-readable storage medium 1805, having stored thereon the computer program, may comprise the instructions which, when executed on at least one processor, cause the at least one processor to carry out the actions described herein, as performed by the communication device. In some embodiments, the computer-readable storage medium may be a non-transitory computer-readable storage medium.

Figure 19:
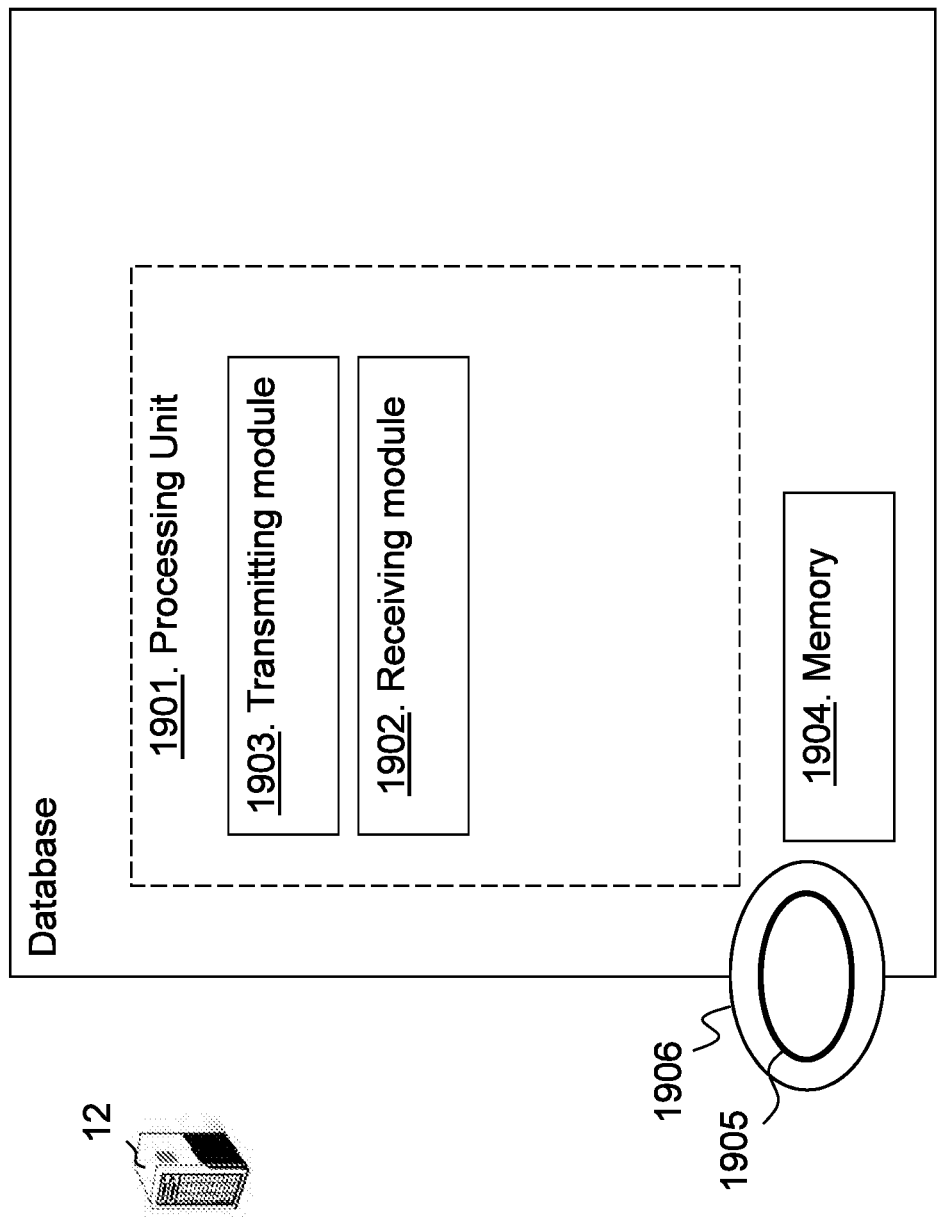
FIG. 19 is a block diagram depicting a database according to embodiments herein.

FIG. 19 is a block diagram depicting the database for enabling communication for the wireless device in the communication network 1. The communication network 1 comprises partitioned sets of functionalities wherein the first set of functionalities belongs to the first network slice, supporting the wireless device 10, of the first core network node 13, and the second set of functionalities belongs to the second network slice, supporting the wireless device 10, of the second core network node 14 or the first core network node 13. The first and second sets of functionalities are separated from one another and other sets of functionalities out of the total set of functionalities in the communication network 1.

The database comprises a processing unit 1901, one or more processors, configured to perform the method herein.

The database comprises a receiving module 1902. The database, the processing unit 1901, and/or the receiving module 1902 may be configured to receive the second paging identity from the radio network node and match that to a stored paging identity out of a plurality of paging identities for the wireless device to locate the context of the wireless device 10 (also stored in the database).

The database comprises a transmitting module 1903. The database, the processing unit 1901, and/or the transmitting module 1903 may be configured to transmit the context or indication of the context of the wireless device 10.

The methods according to the embodiments described herein for the database are respectively implemented by means of e.g. a computer program 1904 or a computer program product, comprising instructions, i.e., software code portions, which, when executed on at least one processor, cause the at least one processor to carry out the actions described herein, as performed by the database. The computer program 1904 may be stored on a computer-readable storage medium 1905, e.g. a disc or similar. The computer-readable storage medium 1905, having stored thereon the computer program, may comprise the instructions which, when executed on at least one processor, cause the at least one processor to carry out the actions described herein, as performed by the database. In some embodiments, the computer-readable storage medium may be a non-transitory computer-readable storage medium.

Embodiments herein relate to a network with network slices i.e. core network with partitioned sets of functionalities where the first core network node 13 supports the first set of functionalities and the second core network node 14 supports the second set of functionalities out of the total set of functionalities in the core networks of the communication network. The first set of functionalities belongs to the first network slice of the core network and the second set belongs to the second network slice, and are separated from another set of functionalities out of the total set of functionalities in the core networks.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, communication device, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method, performed by a radio network node, for enabling communication for a wireless device in a communication network, wherein the communication network comprises partitioned sets of functionalities, wherein a first set of functionalities belongs to a first network slice, supporting the wireless device, of a first core network node, and a second set of functionalities belongs to a second network slice, supporting the wireless device, of a second core network node or the first core network node, and wherein the first and second sets of functionalities are separated from one another and other sets of functionalities out of a total set of functionalities in the communication network, the method comprising:

obtaining, by the radio network node, paging identities comprising a first paging identity and a second paging identity of the wireless device, wherein the first paging identity is associated with the first network slice and the second paging identity is associated with the second network slice;

receiving, by the radio network node, a paging indication for the wireless device from the second network slice of the second core network node or the first core network node, when the wireless device is connected to the first network slice of the first core network node, the received paging indication comprising the second paging identity of the wireless device;

initiating, by the radio network node, a matching process for matching the second paging identity in the received paging indication to the obtained paging identities for locating context of the wireless device, wherein the context is related to the first network slice;

paging, by the radio network node, upon a match of the matching process, the wireless device, connected to the first network slice, for communication with the second network slice by using the located context of the wireless device;

storing the obtained paging identities for the wireless device, wherein the storing comprises sending the obtained paging identities for the wireless device to a database for storage, and wherein the initiating the matching process comprises: sending the second paging identity to the database; and receiving the context or an indication of the context of the wireless device.

2. The method of claim 1, further comprising establishing, by the radio network node, a radio resource control connection, for the wireless device to the first network slice, connecting the wireless device to the first network slice, wherein the radio resource control connection is established between the radio network node and the wireless device.

3. The method of claim 1, further comprising sending a request, to a second radio network node, for performing a handover of the wireless device, the request comprising the obtained paging identities of the wireless device.

4. The method of claim 1, wherein the paging comprises sending unicast paging over a connection established for the first network slice.

5. The method of claim 1,
wherein each paging identity in the obtained paging identities is associated with a security signature,
wherein the received paging indication further comprises a paging security signature, and
wherein the method further comprises verifying that the security signature for the matched paging identity in the obtained paging identities is same as the paging security signature before paging the wireless device.

6. The method of claim 1, further comprising:
intercepting an International mobile subscriber identity (IMSI) paging from the second network slice;
determining which wireless devices served by the radio network node are Radio Resource Control connected to the first network slice and further attached to the second network slice; and
paging all the determined wireless devices with the IMSI paging unicasted.

7. The method of claim 1, wherein each paging identity comprises a slice identity of the respective network slice.

8. The method of claim 1, wherein the first paging identity and the second paging identity are obtained separately.

9. The method of claim 1, wherein the obtaining comprises:
receiving, from the wireless device, the first paging identity when the wireless device is attaching to the first network slice; and
receiving, from the wireless device, the second paging identity when the wireless device is further attaching to the second network slice, wherein the first paging identity is different from the second paging identity.

10. A method, performed by a communication device, for enabling communication for a wireless device in a communication network, wherein the communication network comprises partitioned sets of functionalities, wherein a first set of functionalities belongs to a first network slice, supporting the wireless device, of a first core network node, and a second set of functionalities belongs to a second network slice, supporting the wireless device, of a second core network node or the first core network node, and wherein the first and second sets of functionalities are separated from one another and other sets of functionalities out of a total set of functionalities in the communication network, the method comprising:
providing, to a radio network node associated with the first and second network slices,
paging identities comprising a first paging identity and a second paging identity of the
wireless device, wherein the first paging identity is associated with the first network slice,
wherein the second paging identity is associated with the second network slice, and
wherein the providing comprises:
providing, to the radio network node, the first paging identity when the first paging identity has been allocated by the first core network node; and
providing, to the radio network node, the second paging identity when the second paging identity has been allocated by the second core network node or the first core network node;
storing, by the radio network node, the provided paging identities for the wireless device, wherein the storing comprises sending the provided paging identities for the wireless device to a database for storage; and
initiating, by the radio network node, a matching process for locating context of the wireless device, wherein the context is related to the first network slice, and wherein the initiating the matching process comprises: sending the second paging identity to the database; and receiving the context or an indication of the context of the wireless device.

11. The method of claim 10, wherein providing the first paging identity when the first paging identity has been allocated by the first core network node comprises transmitting, to the radio network node, the first paging identity when the wireless device is attaching to the first network slice, wherein providing the second paging identity when the second paging identity has been allocated by the second core network node or the first core network node comprises transmitting, to the radio network node, the second paging identity when the wireless device is further attaching to the second network slice, and wherein the first paging identity is different from the second paging identity.

12. A radio network node for enabling communication for a wireless device in a communication network, wherein the communication network comprises partitioned sets of functionalities, wherein a first set of functionalities belongs to a first network slice, supporting the wireless device, of a first core network node, and a second set of functionalities belongs to a second network slice, supporting the wireless device, of a second core network node or the first core network node, and wherein the first and second sets of functionalities are separated from one another and other sets of functionalities out of a total set of functionalities in the communication network, the radio network node comprising:
processing circuitry; and
memory containing instructions executable by the processing circuitry whereby the radio network node is operative to:
obtain paging identities comprising a first paging identity and a second paging identity of the wireless device, wherein the first paging identity is associated with the first network slice and the second paging identity is associated with the second network slice;
receive a paging indication for the wireless device from the second network slice of the second core network node or the first core network node, when the wireless device is connected to the first network slice of the first core network node, the received paging indication comprising the second paging identity of the wireless device;
initiate a matching process for matching the second paging identity in the received paging indication to the obtained paging identities for locating context of the wireless device, wherein the context is related to the first network slice; and
page, upon a match of the matching process, the wireless device, connected to the first network slice, for communication with the second network slice by using the located context of the wireless device,
wherein the instructions are such that the radio network node is further operative to store the obtained paging identities for the wireless device, and
wherein the instructions are such that the radio network node is operative to:

store the obtained paging identities by sending the obtained paging identities for the wireless device to a database for storage; and initiate the matching process by sending the second paging identity to the database, and receiving the context or an indication of the context to the wireless device.

13. The radio network node of claim 12, wherein the instructions are such that the radio network node is further operative to establish a radio resource control connection, for the wireless device to the first network slice, connecting the wireless device to the first network slice, and wherein the radio resource control connection is established between the radio network node and the wireless device.

14. The radio network node of claim 12, wherein the instructions are such that the radio network node is further operative to send a request, to a second radio network node, for performing a handover of the wireless device, the request comprising the obtained paging identities of the wireless device.

15. The radio network node of claim 12, wherein the instructions are such that the radio network node is operative to page the wireless device by sending unicast paging over a connection established for the first network slice.

16. The radio network node of claim 12:
wherein each paging identity in the obtained paging identities is associated with a security signature,
wherein the received paging indication further comprises a paging security signature, and
wherein the instructions are such that the radio network node is further operative to verify that the security signature of the matched paging identity in the obtained paging identities is same as the paging security signature before paging the wireless device.

17. The radio network node of claim 12, wherein the instructions are such that the radio network node is further operative to:
intercept an International mobile subscriber identity (IMSI) paging from the second network slice;
determine which wireless devices served by the radio network node are Radio Resource Control connected to the first network slice and further attached to the second network slice; and
page all the determined wireless devices with the IMSI paging unicasted.

18. The radio network node of claim 12, wherein each paging identity comprises a slice identity of the respective network slice.

19. The radio network node of claim 12, wherein the instructions are such that the radio network node is operative to obtain the paging identities by:
receiving, from the wireless device, the first paging identity when the wireless device is attaching to the first network slice; and
receiving, from the wireless device, the second paging identity when the wireless device is further attaching to the second network slice, wherein the first paging identity is different from the second paging identity.

20. A communication device for enabling communication for a wireless device in a communication network, wherein the communication network comprises partitioned sets of functionalities, wherein a first set of functionalities belongs to a first network slice, supporting the wireless device, of a first core network node, and a second set of functionalities belongs to a second network slice, supporting the wireless device, of a second core network node or the first core network node, and wherein the first and second sets of functionalities are separated from one another and other sets of functionalities out of a total set of functionalities in the communication network, the communication device comprising:
processing circuitry; and
memory containing instructions executable by the processing circuitry whereby the communication device is operative to:
provide, to a radio network node associated with the first and second network slices, paging identities comprising a first paging identity and a second paging identity of the wireless device, wherein the first paging identity is associated with the first network slice, wherein the second paging identity is associated with the second network slice, and wherein the instructions are such that the communication device is operative to provide the paging identities by:
providing, to the radio network node, the first paging identity when the first paging identity has been allocated by the first core network node; and
providing, to the radio network node, the second paging identity when the second paging identity has been allocated by the second core network node or the first core network node;
store the provided paging identities for the wireless device, wherein the instructions are such that the communication device is operative to store the provided paging identities by sending the provided paging identities for the wireless device to a database for storage; and
initiate a matching process for locating context of the wireless device, wherein the context is related to the first network slice, and wherein the instructions are such that the communication device is operative to initiate the matching process by: sending the second paging identity to the database; and receiving the context or an indication of the context of the wireless device.

21. The communication device of claim 20, wherein the instructions are such that the communication device is operative to provide the first paging identity when the first paging identity has been allocated by the first core network node by transmitting, to the radio network node, the first paging identity when the wireless device is attaching to the first network slice, wherein the instructions are such that the communication device is operative to provide the second paging identity when the second paging identity has been allocated by the second core network node or the first core network node by transmitting, to the radio network node, the second paging identity when the wireless device is further attaching to the second network slice, and wherein the first paging identity is different from the second paging identity.

22. A non-transitory computer readable recording medium storing a computer program product for controlling a radio network node for enabling communication for a wireless device in a communication network, wherein the communication network comprises partitioned sets of functionalities, wherein a first set of functionalities belongs to a first network slice, supporting the wireless device, of a first core network node, and a second set of functionalities belongs to a second network slice, supporting the wireless device, of a second core network node or the first core network node, and wherein the first and second sets of functionalities are separated from one another and other sets of functionalities out of a total set of functionalities in the communication network, the computer program product comprising software instructions which, when run on processing circuitry of the radio network node, cause the radio network node to:

obtain paging identities comprising a first paging identity and a second paging identity of the wireless device, wherein the first paging identity is associated with the first network slice and the second paging identity is associated with the second network slice;

receive a paging indication for the wireless device from the second network slice of the second core network node or the first core network node, when the wireless device is connected to the first network slice of the first core network node, the received paging indication comprising the second paging identity of the wireless device;

initiate a matching process for matching the second paging identity in the received paging indication to the obtained paging identities for locating context of the wireless device, wherein the context is related to the first network slice;

page, upon a match of the matching process, the wireless device, connected to the first network slice, for communication with the second network slice by using the located context of the wireless device; and store the obtained paging identities for the wireless device, wherein the software instructions are such that the radio network node is caused to store the obtained paging identities by sending the obtained paging identities for the wireless device to a database for storage, and wherein the software instructions are such that the radio network node is caused to initiate the matching process by: sending the second paging identity to the database; and receiving the context or an indication of the context of the wireless device.

23. A non-transitory computer readable recording medium storing a computer program product for controlling a communication device for enabling communication for a wireless device in a communication network, wherein the communication network comprises partitioned sets of functionalities, wherein a first set of functionalities belongs to a first network slice, supporting the wireless device, of a first core network node, and a second set of functionalities belongs to a second network slice, supporting the wireless device, of a second core network node or the first core network node, and wherein the first and second sets of functionalities are separated from one another and other sets of functionalities out of a total set of functionalities in the communication network, the computer program product comprising software instructions which, when run on processing circuitry of the communication device, cause the communication device to:

provide, to a radio network node associated with the first and second network slices, paging identities comprising a first paging identity and a second paging identity of the wireless device, wherein the first paging identity is associated with the first network slice, wherein the second paging identity is associated with the second network slice, and wherein the software instructions cause the communication device to provide the paging identities by:

providing, to the radio network node, the first paging identity when the first paging identity has been allocated by the first core network node; and providing, to the radio network node, the second paging identity when the second paging identity has been allocated by the second core network node or the first core network node;

store the provided paging identities for the wireless device, wherein the software instructions are such that the communication device is caused to store the provided paging identities by sending the provided paging identities for the wireless device to a database for storage; and initiate a matching process for locating context of the wireless device, wherein the context is related to the first network slice, and wherein the software instructions are such that the communication device is caused to initiate the matching process by: sending the second paging identity to the database; and receiving the context or an indication of the context of the wireless device.

* * * * *